(12) United States Patent
Aquino et al.

(10) Patent No.: US 10,773,428 B2
(45) Date of Patent: Sep. 15, 2020

(54) VACUUM PORT BASE

(71) Applicant: The Boeing Company, Chicago, IL (US)

(72) Inventors: Timothy David Aquino, Lacey, WA (US); Cody Allan Beagley, Jordan, UT (US); John R. Henry, Sandy, UT (US); Jordan McHale Edginton, West Jordan, UT (US); William Henry Ingram, Jr., Puyallup, WA (US); William S. Hollensteiner, Kent, WA (US); Benjamin Jeffrey Stephenson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 15/823,766

(22) Filed: Nov. 28, 2017

(65) Prior Publication Data
US 2018/0079115 A1    Mar. 22, 2018

Related U.S. Application Data

(63) Continuation-in-part of application No. 14/990,736, filed on Jan. 7, 2016, now Pat. No. 10,357,922.

(51) Int. Cl.
*B29C 37/00* (2006.01)
*B29C 70/54* (2006.01)
(Continued)

(52) U.S. Cl.
CPC .......... *B29C 37/0064* (2013.01); *B29C 33/18* (2013.01); *B29C 70/06* (2013.01);
(Continued)

(58) Field of Classification Search
CPC .............. B29C 2791/006; B29C 33/18; B29C 37/0064; B29C 70/06; B29C 70/342;
(Continued)

(56) References Cited

U.S. PATENT DOCUMENTS 3,391,424 A    7/1968   Drossbach
4,852,916 A *  8/1989   Johnson .................. F16L 41/14
                                                          285/187

(Continued)

FOREIGN PATENT DOCUMENTS

CN    102712142 A    10/2012
CN    103085290 A    5/2013
CN    104275808 A    1/2015

OTHER PUBLICATIONS

National Intellectual Property Administration of PRC Notification of First Office Action and English Translation, dated Mar. 4, 2020, regarding Application No. 201710006004.4, 15 pages.

*Primary Examiner* — Matthew J Daniels
*Assistant Examiner* — Yunju Kim
(74) *Attorney, Agent, or Firm* — Yee & Associates, P.C.

(57) ABSTRACT

A vacuum port base comprises an upper face, a lower face, a first channel, and a second channel. The upper face is configured to interface with a vacuum port. The lower face is configured to interface with a surface of a tool. The first channel formed in the lower face is configured to receive an edge breather. The second channel formed within the vacuum port base is configured to receive the vacuum port such that the vacuum port is in fluid communication with the first channel and the edge breather to remove gases from a composite structure.

20 Claims, 28 Drawing Sheets

(51) Int. Cl.
  *B29C 70/34* (2006.01)
  *B29C 70/06* (2006.01)
  *B29C 70/44* (2006.01)
  *B29C 33/18* (2006.01)
  *B29K 105/08* (2006.01)
  *B29L 31/30* (2006.01)
  *B29K 105/06* (2006.01)
  *B29K 105/00* (2006.01)

(52) U.S. Cl.
  CPC .......... *B29C 70/342* (2013.01); *B29C 70/443* (2013.01); *B29C 70/54* (2013.01); *B29C 70/543* (2013.01); *B29C 70/548* (2013.01); *B29C 2791/006* (2013.01); *B29K 2105/06* (2013.01); *B29K 2105/0872* (2013.01); *B29K 2105/253* (2013.01); *B29L 2031/30* (2013.01); *B29L 2031/3076* (2013.01); *B29L 2031/3085* (2013.01)

(58) Field of Classification Search
  CPC ..... B29C 70/443; B29C 70/54; B29C 70/543; B29C 70/548; B29C 45/1775; B29C 70/44; B29C 70/547; B29C 43/12; B29K 2105/06; B29K 2105/0872; B29K 2105/253; B29L 2031/30; B29L 2031/3076; B29L 2031/3085
  USPC ........................................................ 264/102
  See application file for complete search history.

(56) References Cited

U.S. PATENT DOCUMENTS

| | | | |
|---|---|---|---|
| 2008/0083493 A1* | 4/2008 | Ridges | B29C 70/44 156/285 |
| 2009/0051076 A1* | 2/2009 | Kofoed | B29C 70/547 264/258 |
| 2014/0035275 A1* | 2/2014 | Crane | B29C 45/1775 285/141.1 |
| 2014/0327190 A1* | 11/2014 | Ballow | B29C 43/12 264/571 |
| 2017/0129195 A1 | 5/2017 | Stephenson et al. | |
| 2017/0197370 A1 | 7/2017 | Stephenson et al. | |

* cited by examiner

VACUUM PORT BASE

CROSS-REFERENCE TO RELATED APPLICATION

This application is a continuation-in-part of U.S. patent application Ser. No. 14/990,736, filed Jan. 7, 2016, entitled "Edge Breathers for Composite Products," now U.S. Pat. No. 10,357,922, issued Jul. 23, 2019, which is incorporated herein by reference in its entirety.

BACKGROUND INFORMATION

1. Field

The present disclosure relates generally to manufacturing composite structures. More specifically, the present disclosure relates to a low-profile vacuum port base used in manufacturing composite structures for aircraft applications.

2. Background

Manufacturers increasingly use composite structures to provide light-weight and structurally sound parts for various applications. Many of these composite structures are manufactured using vacuum bag processing. With such techniques, layers of composite material are laid up on a tool and cured using heat and pressure to form a desired shape for the part. During curing, a vacuum bag surrounds the part and a portion of the tool, and a vacuum applies pressure to contour the layers of composite material against the tool. A vacuum port and a vacuum line are secured to the vacuum bag through a vacuum port base.

In addition to forming the shape of the part, vacuum conditions remove undesired compounds from the composite material used to form the part. For example, the vacuum evacuates volatile gases or air present within or between the layers of composite material. This process is important to help mitigate potential laminate defects.

As part of the process, evacuation tools, commonly known as breathers, are placed proximate to and over the top of the layers of composite material. These breathers provide passageways for air and other gases to be drawn out of the layers under vacuum.

Vacuum bag systems often require multiple pieces to fit together and maintain fluid communication with the breathers to effectively draw out undesired gases. More than one breather may be required. Further, many of the currently available vacuum bag systems employ consumable parts. For instance, some breathers are designed from material configured for one-time use. Vacuum bag tears, consumable parts, and low-flow issues may make manufacturing of composite structures more expensive and time-consuming than desired.

Therefore, it would be desirable to have a method and an apparatus that take into account at least some of the issues discussed above, as well as other possible issues.

SUMMARY

An illustrative embodiment of the present disclosure provides a vacuum port base comprising an upper face, a lower face, a first channel, and a second channel. The upper face is configured to interface with a vacuum port. The lower face is configured to interface with a surface of a tool. The first channel formed in the lower face is configured to receive an edge breather. The second channel formed within the vacuum port base is configured to receive the vacuum port such that the vacuum port is in fluid communication with the first channel and the edge breather to remove gases from a composite structure.

Another illustrative embodiment of the present disclosure provides a method for forming a composite structure. Layers of composite material are laid up on a tool. An edge breather is positioned along a perimeter of the layers of composite material. A vacuum port base is positioned over the edge breather such that a first channel formed in a lower face of the vacuum port base receives the edge breather. The lower face interfaces with the tool. A vacuum chamber is created around the layers of composite material, the edge breather, the vacuum port, and a portion of the tool using a vacuum bag. A vacuum is drawn in the vacuum chamber such that gases pass from the layers of composite material through the edge breather and into the first channel of the vacuum port base. These gases are then drawn out of the system.

A further illustrative embodiment of the present disclosure provides a composite structure manufacturing system for aircraft parts comprising a tool for forming a composite structure, a rigid breather, a vacuum port, a vacuum port base, and a vacuum bag. The rigid breather is positioned on top of a surface of the tool and proximate to a stack-up of composite material. The vacuum port base is positioned on top of the rigid breather. The vacuum port base comprises an upper face, a lower face, a first channel, and a second channel. The upper face is configured to interface with the vacuum port. The lower face is configured to interface with a surface of the tool. The first channel is formed in the lower face and configured to receive the rigid breather. The second channel is formed within the vacuum port base and configured to receive the vacuum port such that the vacuum port is in fluid communication with the first channel and the rigid breather. The vacuum bag creates a vacuum chamber around the rigid breather, the vacuum port base, the layers of composite material, and a portion of the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the manufacturing process for composite structures is often more expensive and time-consuming than desired. Current vacuum bag curing processes may use consumables that increase the cost of manufacturing. These consumables are single-use. In some cases, tape, adhesives, breathers, and even vacuum bags used in the vacuum curing system may not be used more than once.

Even with vacuum curing system configurations that employ recyclable parts, multiple ports may be needed to create a desired level of evacuation flow from the composite layers under a vacuum. As the number of ports increases, the risk of inadvertent damage to the vacuum bag, such as rupture or tearing, increases. Multiple ports also increase the risk of port failure and require more touch time by operators during bagging operations. Thick or bulky port bases may compound these problems.

Moreover, currently used tooling assemblies may need modification before recyclable parts, such as rigid breathers, can be used. Such tooling modification increases the cost of production for composite structure.

The disclosed embodiments relate to a versatile, cost-saving vacuum port base used in manufacturing of composite structures. The embodiments are configured for use with all types of edge breathers, whether they are consumable, single-use breathers or rigid breathers. A vacuum port base in accordance with an illustrative embodiment maintains increased fluid flow between the vacuum line and the edge breather.

Figure 1:
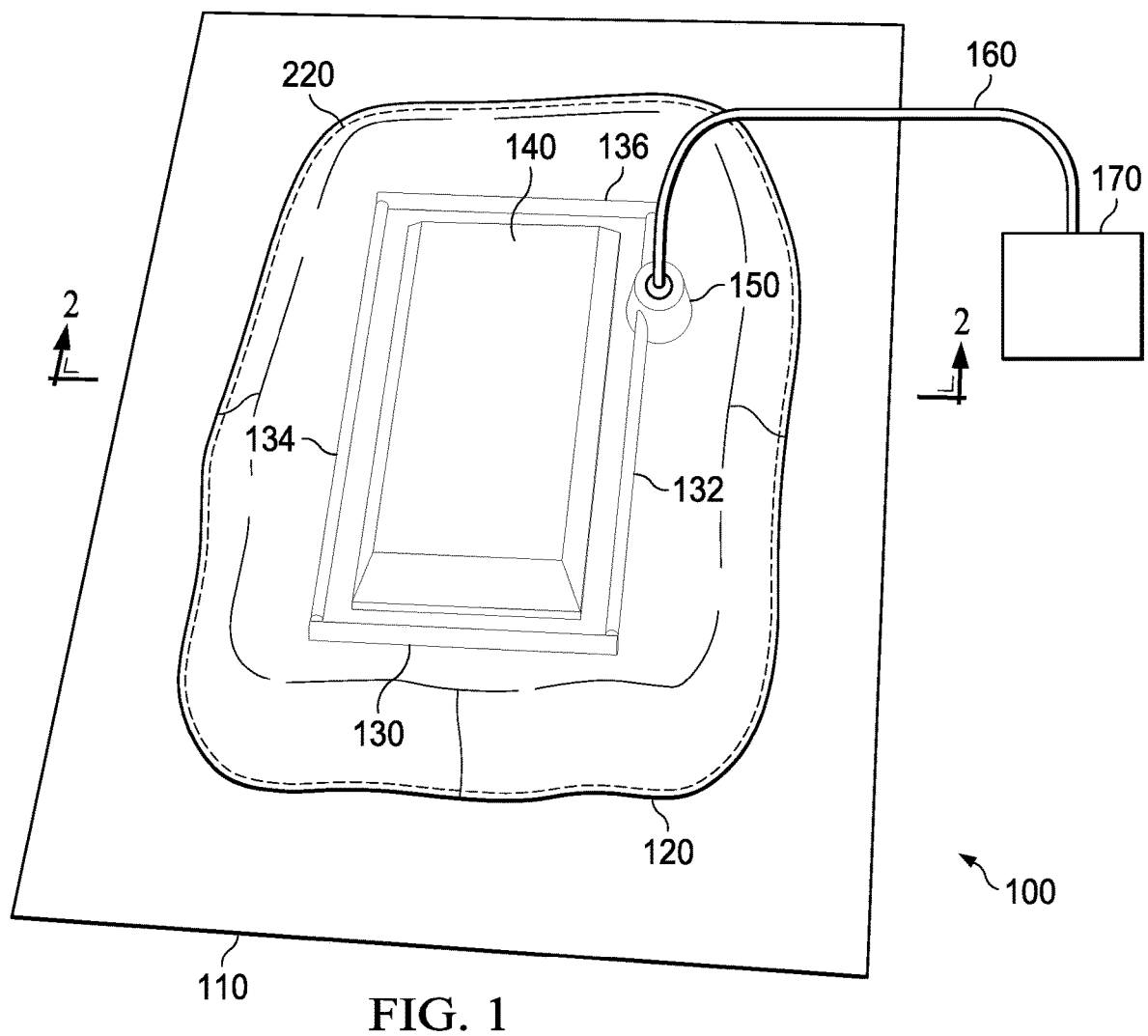
FIG. 1 is an illustration of a vacuum bag manufacturing system in accordance with an illustrative embodiment.

With reference now to the figures and, in particular, with reference to FIG. 1, an illustration of vacuum bag manufacturing system 100 is depicted in accordance with an illustrative embodiment. System 100 comprises any combination of components and/or devices that are capable of utilizing vacuum bag techniques to consolidate and/or cure a composite part (e.g., a fiber reinforced composite part such as an aircraft wing or any other suitable component). System 100 has been enhanced to utilize edge breathers (130, 132, 134, 136) with rigid cross-sections that resist crushing pressure and heat applied during the curing process (e.g., hundreds of ° F. and/or 90 PSI), and that also define hollow interiors that air and volatile gases may travel through in order to exit system 100 (e.g., via vacuum hose 160). Unlike soft edge breathers, the edge breathers described herein do not crush or constrict when curing pressure and heat are applied.

In this embodiment, system 100 includes rigid tool 110 (e.g., a mold). Part 140 conforms to an upper surface of tool 110 during manufacturing. As shown in FIG. 1, part 140 is held in place on tool 110 via vacuum bag 120, which is taped/sealed via edge sealant 220 to tool 110.

Vacuum bag 120 covers part 140, as well as edge breathers 130, 132, 134, and 136. Edge breathers (130, 132, 134, 136) have hollow interiors that act as passageways for air and volatile gases from the curing process to travel out from part 140. The air and volatile gases exit vacuum bag 120 via port 150, which is coupled with vacuum line 160. Vacuum line 160 is powered in this embodiment by vacuum pump 170.

While in operation in one embodiment, vacuum pump 170 may generate about one atmosphere of negative pressure on vacuum bag 120. The negative pressure forces vacuum bag 120 against part 140 to conform part 140 to tool 110. The negative pressure also causes vacuum bag 120 to tightly conform to the edge breathers (130, 132, 134, 136). This provides a benefit by holding part 140 tightly against the contours of tool 110 as part 140 consolidates, and also provides a benefit in that it may draw out volatile gases and air bubbles that may be present during processing of part 140. The processing of part 140 may therefore include curing, consolidating and/or drawing out volatile gases, and may further involve the application of substantial amounts of pressure and/or heat.

Edge breathers (130, 132, 134, 136) of system 100 have been enhanced to exhibit a geometry that resists collapse under the pressure applied by vacuum bag 120. That is, edge breathers 130, 132, 134, and 136 are rigid with respect to crushing forces applied to their cross-sections, and are capable of resisting (or entirely preventing) deformation when vacuum bag 120 applies crushing pressure to their cross-sections.

In some embodiments, these edge breathers (130, 132, 134, 136) are also flexible along their length, ensuring that they may conform to the varying and even curving contours of different manufactured parts. As used herein, an edge breather is flexible "along its length" when it is capable of being dynamically adjusted and/or reshaped to conform to the edges of a complex part. For example, an edge breather that is reshaped from a straight line into a curved shape (e.g., without the application of more than ten foot-pounds of torque applied by a user), and retains the curved shape without returning to its original shape, may be considered an edge breather that is flexible along its length. Thus, the edge breathers described herein (130, 132, 134, 136) are rigid with respect to compression of their cross-sectional area, yet also flexible enough along their length to conform around different kinds of part geometry. Further details of the edge breathers (130, 132, 134, 136) will be described with regard to FIGS. 6-13 below.

Figure 2:
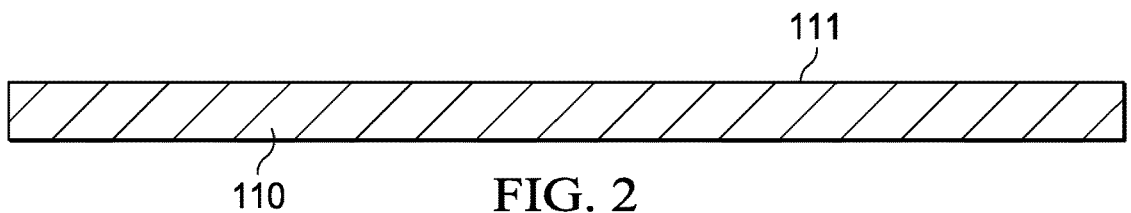
FIGS. 2-5 are illustrations of section cut views showing preparation of a vacuum bag manufacturing system.

FIGS. 2-5 are section cut views of system 100 as system 100 is assembled in an illustrative embodiment. These cross-sectional views are shown along lines 2-2 in FIG. 1. Further description of system 100 is provided with respect to FIGS. 2-5, which discuss how individual components may be assembled to facilitate vacuum bag manufacturing. FIG. 2 illustrates tool 110 (a mold) in a resting state. The top surface 111 of tool 110 may be coated with a release agent to ensure that parts placed atop tool 110 do not bind to tool 110 during and/or after the curing process.

Figure 3:
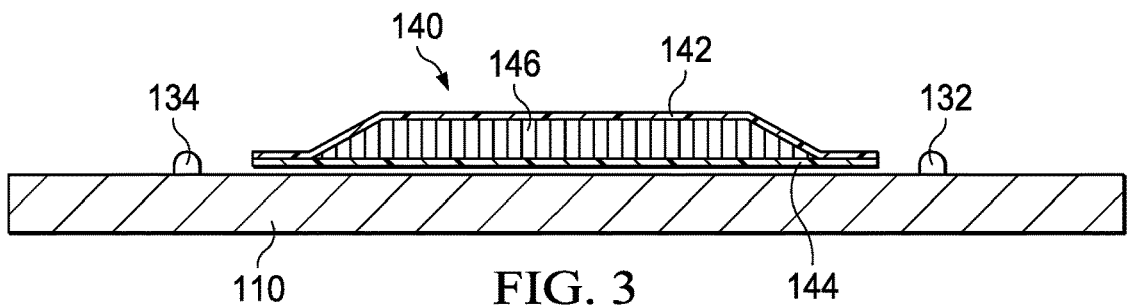

In FIG. 3, edge breathers (e.g., 132 and 134 as shown) are placed onto tool 110 in a first step for assembling system 100 atop tool 110 shown in FIG. 2. Part 140 is also placed on tool 110. In this embodiment, part 140 consists of layers/plies 142 and 144, as well as core 146. However, in further embodiments a solid laminate composite charge may take the place of core 146. Any suitable composite structure may be utilized for part 140. Edge breathers 132 and 134 are placed within several inches (e.g., 2 to 12 inches) of part 140. Edge breathers 132 and 134 act as lanes for air proximate to part 140 to be sucked away from part 140 to ensure that air bubbles (not shown) will not interfere with the curing of part 140.

Figure 4:
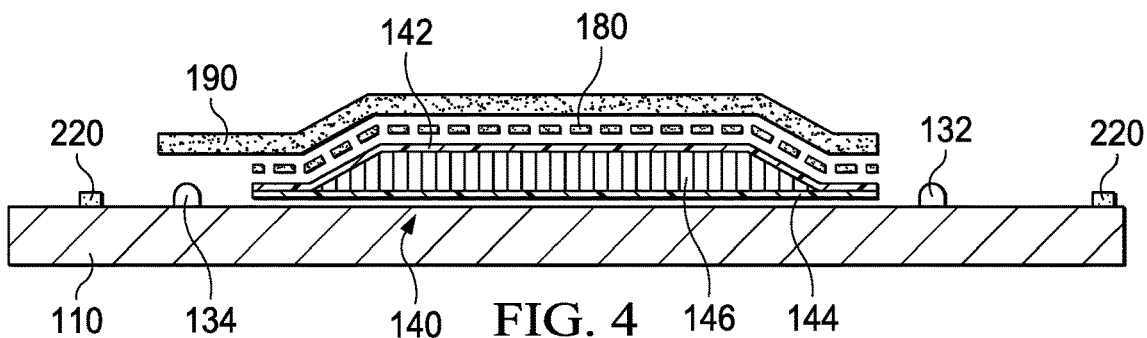

FIG. 4 illustrates a next step for assembling a system 100, in which further components are added to those shown in FIG. 3. Specifically, FIG. 4 illustrates that edge sealant 220 (e.g., a double-sided tape) has been applied onto tool 110 at the periphery of breathers 132 and 134. FIG. 4 further illustrates the application of parting film 180 to part 140, as well as the application of a surface breather 190 atop parting film 180 and edge breathers 132 and 134. Parting film 180 may comprise a permeable Teflon layer that prevents part 140 from sticking to other components. Edge breathers (130, 132, 134, 136), in combination with surface breather 190, form passageways for air and volatile gases (e.g., volatile organic compounds) to exit part 140 before and/or during curing.

Figure 5:
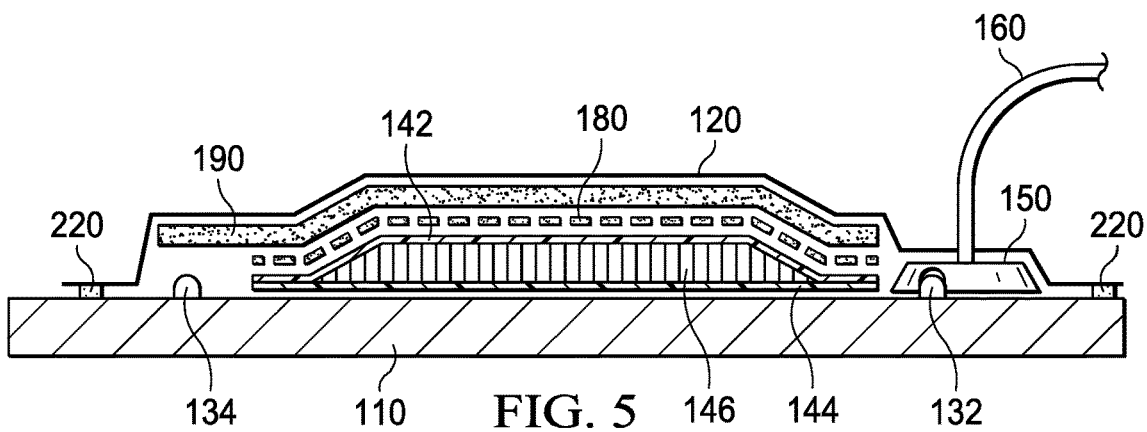

FIG. 5 illustrates a further step for assembling a system 100, in which still more components are added to those shown in FIG. 4. According to FIG. 5, part 140 is covered by parting film 180. Surface breather 190 and the components beneath it are sealed onto tool 110 by vacuum bag 120, which is attached via edge sealant 220 to tool 110. In this arrangement, surface breather 190 provides a porous lane through which air may travel into the edge breathers (130, 132, 134, 136), and then from the edge breathers (130, 132, 134, 136) to port 150. Vacuum port 150 covers edge breather 132, and provides a route for air and/or volatiles to travel from an edge breather (e.g., 130, 132, 134, 136) out through vacuum hose 160. Vacuum pump 170 may therefore draw out air from vacuum bag 120 via the edge breathers (e.g., 132, 134) and out of vacuum port 150, pressing part 140 onto tool 110.

The process of adding and curing a layer ("lay up") onto to part 140 as shown in FIGS. 2-5 may continue as an iterative process to add and cure multiple layers, wherein new "green" layers are added to part 140 and cured, and then further new "green layers" are added again. Utilizing this technique, a manufacturer may add, for example, several thousandths of an inch of thickness to part 140 at a time, until part 140 is completed.

Figure 6:
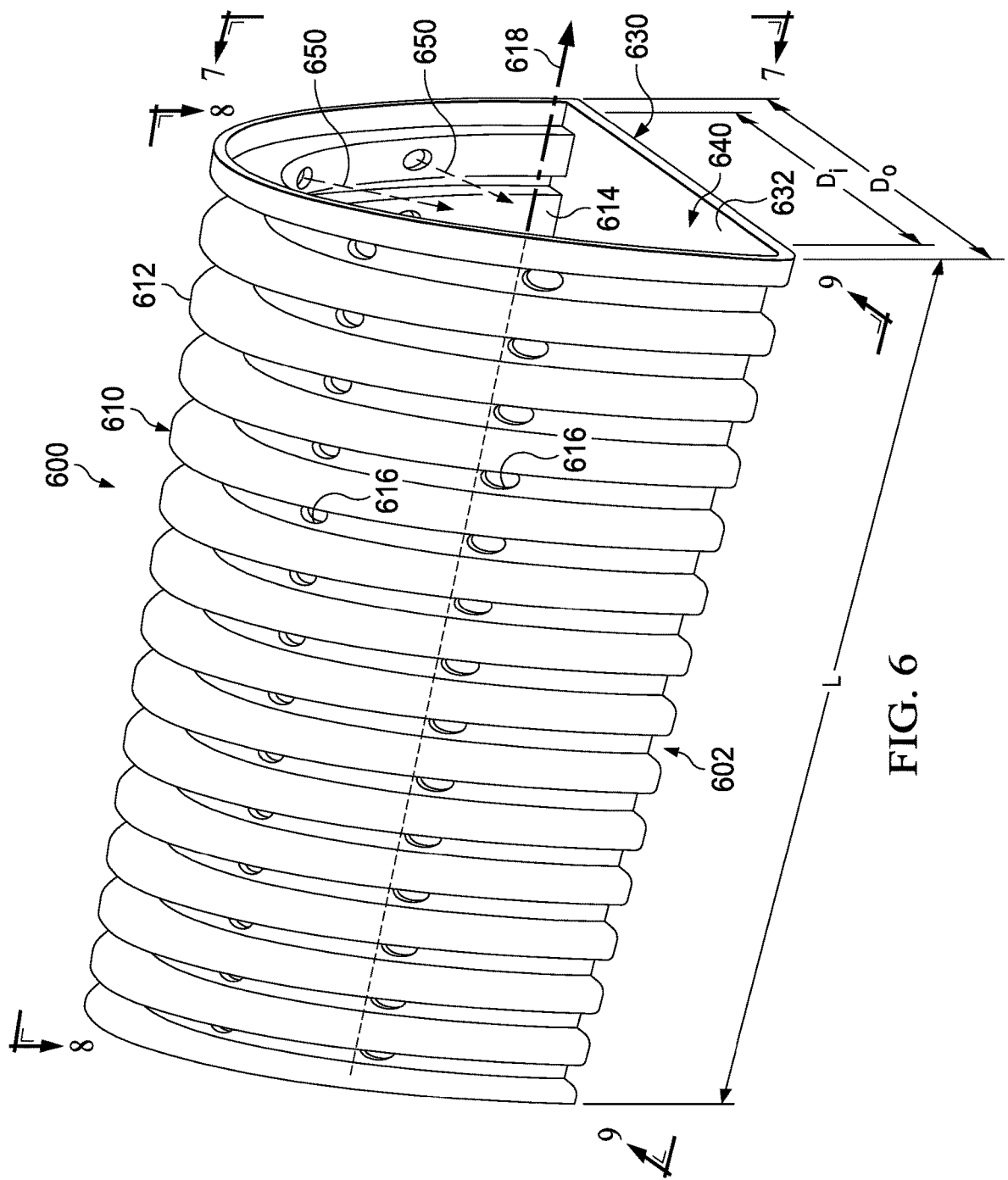
FIGS. 6-9 are illustrations of a first style of an edge breather in accordance with an illustrative embodiment.
Figure 7:
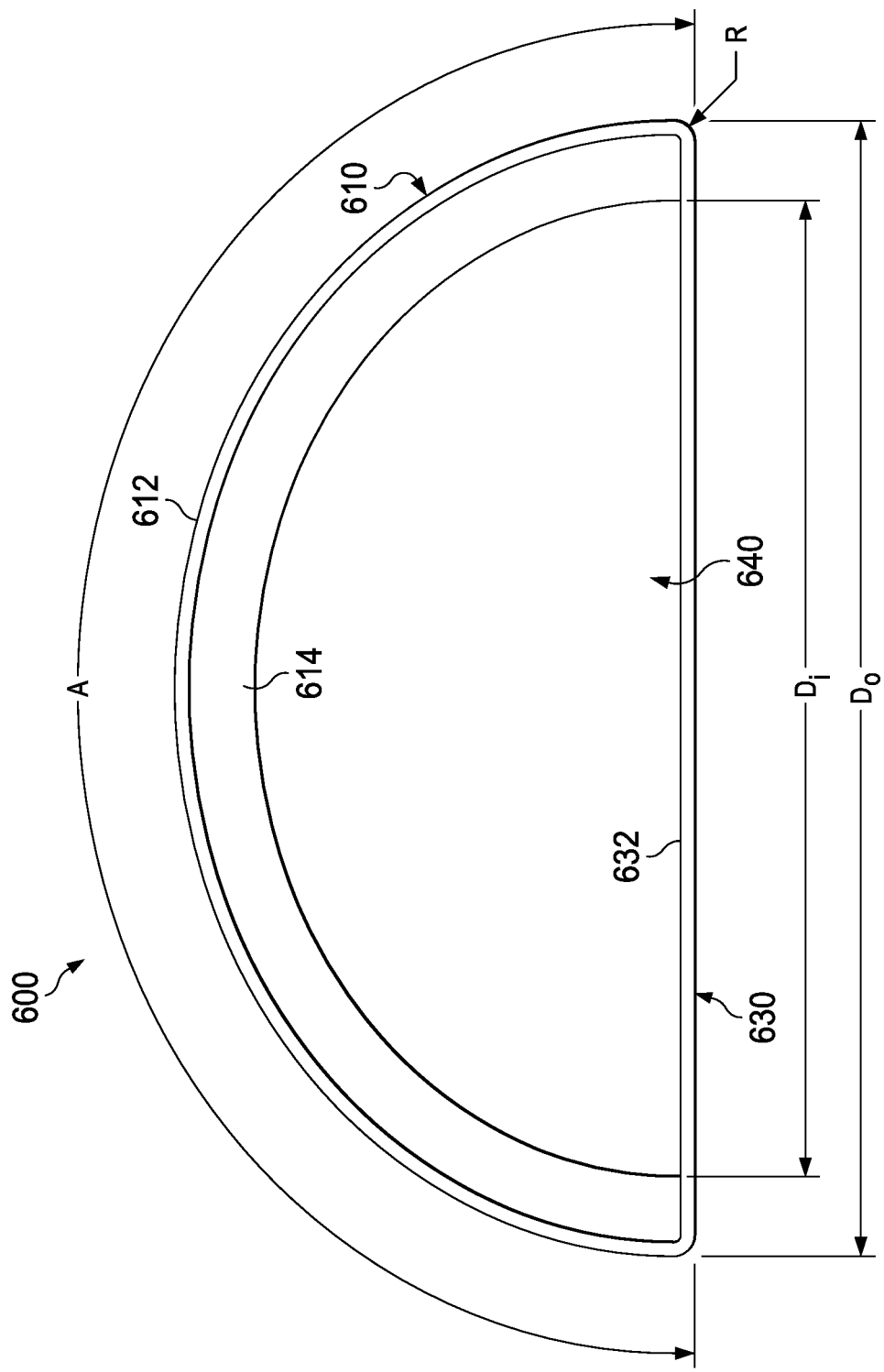
Figure 8:
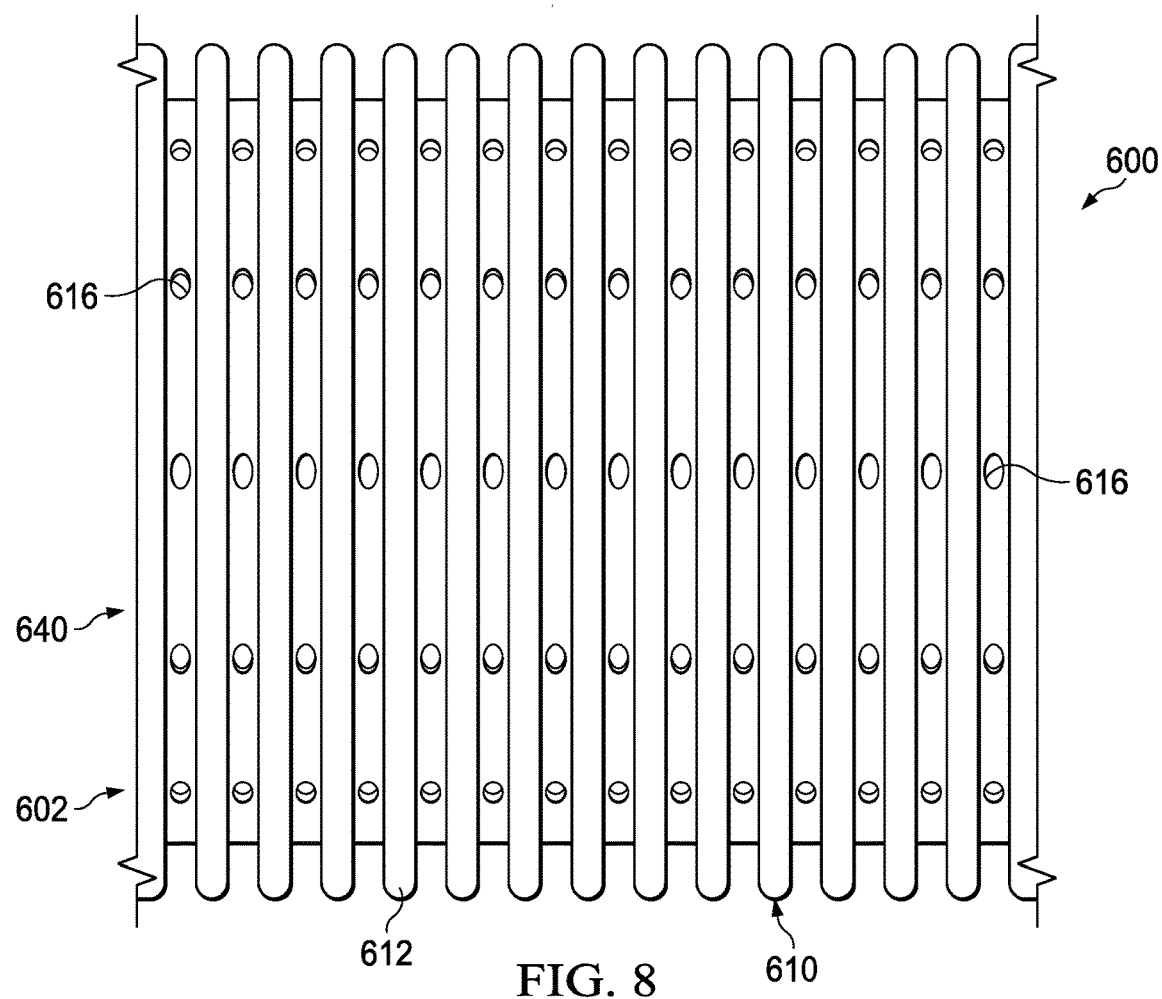
Figure 9:
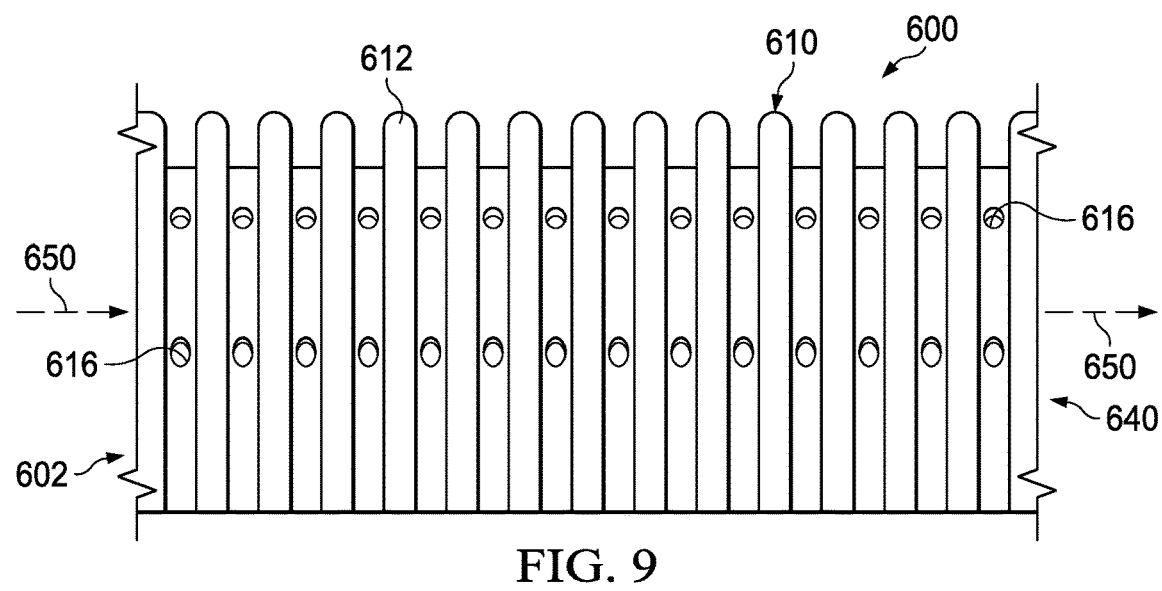

Illustrative details of the edge breathers described above will be discussed with regard the following Figures. FIGS. 6-11 illustrate a first style of edge breather 600 in an illustrative embodiment that can withstand the heat and pressure of an autoclave curing process. FIG. 6 illustrates a perspective view of edge breather 600, FIG. 7 illustrates a front view of edge breather 600 shown by view arrows 7, FIG. 8 illustrates a top view of edge breather 600 shown by view arrows 8, and FIG. 9 illustrates a side view of edge breather 600 shown in the direction of view lines 9-9 in FIG. 6.

In this embodiment, edge breather 600 has a body 602 in the form of an elongated tube with a D-shaped cross-sectional shape/circumference. Upper surface 610 and lower surface 630 are outer surfaces of edge breather 600, which define the circumference of edge breather 600. In combination, these outer surfaces (610 and 630) define the boundaries of hollow interior 640. Furthermore, lower surface 630 of edge breather 600 defines base 632. Base 632 is coupled with ridges 612 and furrows 614. While lower surface 630 is illustrated as being substantially flat, in further embodiments lower surface 630 may be shaped during manufacturing to exhibit a geometry that conforms to surface 111 of tool 110.

Ridges 612 and furrows 614 are integral with upper surface 610, which is corrugated. Ridges 612 also each define an arc (A), which is perpendicular to lengthwise axis 618 of edge breather 600. These features enhance the cross-sectional strength of edge breather 600 against crushing forces, while the corrugation also ensures that edge breather 600 remains more flexible along its length than a corresponding edge breather lacking corrugation. In short, the arcs defined by the ridges and furrows resist compressive loads applied to edge breather 600 and prevent hollow interior 640 from collapsing under pressure applied to edge breather 600 by a vacuum bag during manufacturing of a composite part.

Ridges 612 exhibit a diameter $D_o$, while furrows 614 exhibit a diameter $D_i$ which is less than $D_o$. $D_o$ may also be considered the width (W) of edge breather 600. With respect to ridges 612 and furrows 614, the ratio of $D_i$ to $D_o$ may vary as desired. In one embodiment, $D_o$ is no more than twice as large as $D_i$. Varying $D_i$ and $D_o$ (and varying the linear distance between neighboring ridges 612) also alters the flexibility of edge breather 600 along its length. A combination of dimensions may therefore be chosen, for example, to ensure that edge breather 600 is capable of conforming to small radii of curvature (e.g., three inches) without returning to its original shape.

Upper surface 610 also includes one or more openings/holes 616, which penetrate from upper surface 610 to hollow interior 640. The holes 616 may be located on top of ridges 612, within ridges 612, or at furrows 614. The holes 616 may be inserted as many times as desired throughout edge breather 600, so long as they do not compromise the structural integrity of edge breather 600. While in operation, edge breather 600 functions as a corrugated tube through which air flow 650 may evacuate from part 140 and enter holes 616. This air flow 650 travels into and along the length (L) of edge breather 600.

In further embodiments, edge breather 600 may exhibit an elliptical or circular cross-section, or may even exhibit trapezoidal shapes with rounded corners (in which case rounded corners at the sides of the trapezoidal shape may function as arcs for bearing/distributing load), rounded rectangle, or other cross-sectional shapes. Furthermore, holes 616 of edge breather need not be collinear with each other, but rather may be spaced in any suitable pattern about edge breather 600, or may even be substantially randomly placed. While holes 616 are shown as being circular shaped in this embodiment, any suitable shape may be chosen.

Similarly, the diameter of each hole 616 may vary or remain constant across edge breather 600. In one embodiment, edge breather 600 is less than one inch wide (e.g., three eighths of an inch), and holes 616 are less than one tenth of an inch in diameter (e.g., fifty thousandths of an inch). As shown in these Figures, the "D" shaped cross-section of edge breather 600 includes rounded corners (R) which each exhibit corner radii that are selected to prevent rupturing or snagging a vacuum bag when curing a composite part.

Figure 10:
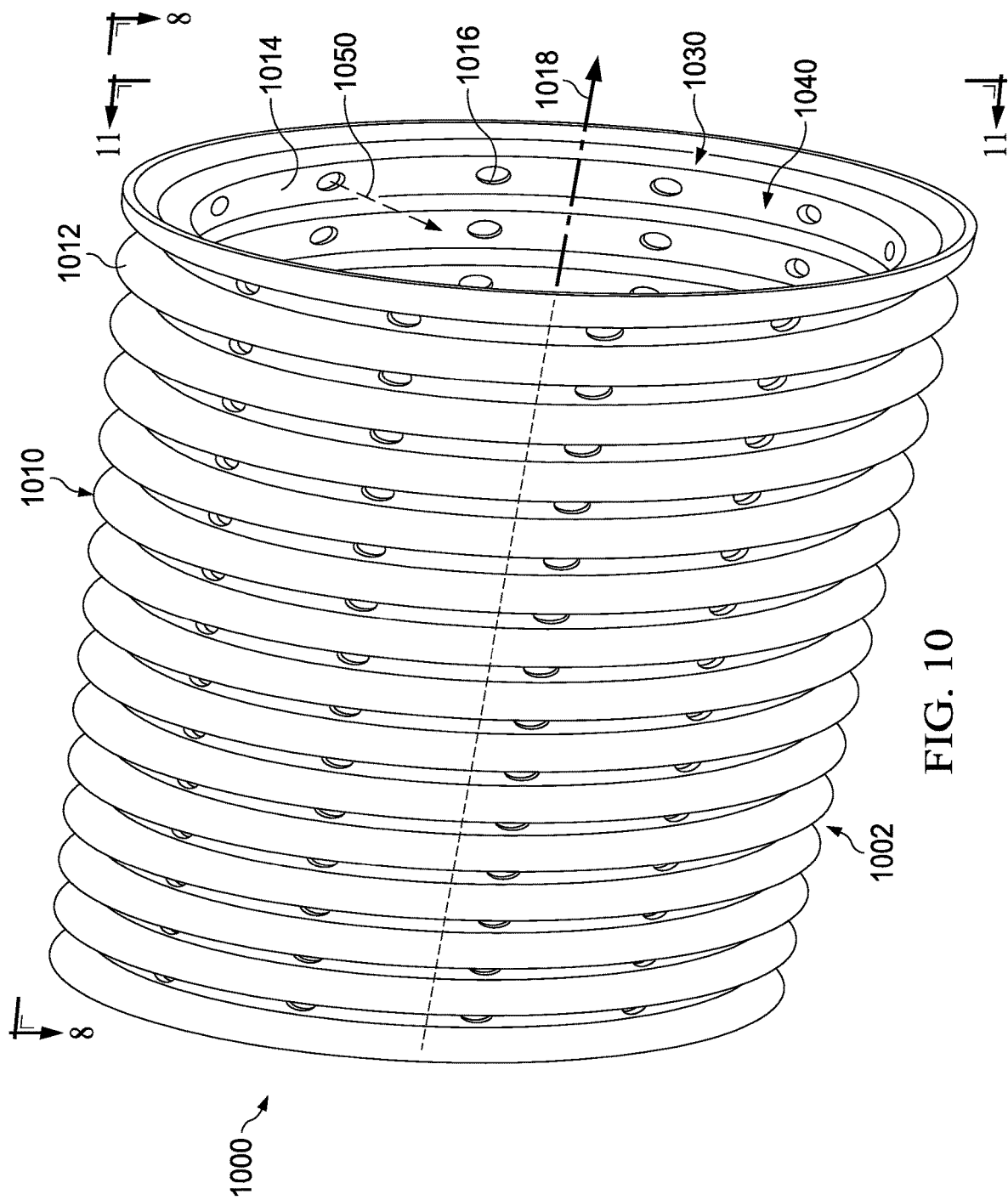
FIGS. 10-11 are illustrations of a variation of a first style of an edge breather in accordance with an illustrative embodiment.
Figure 11:
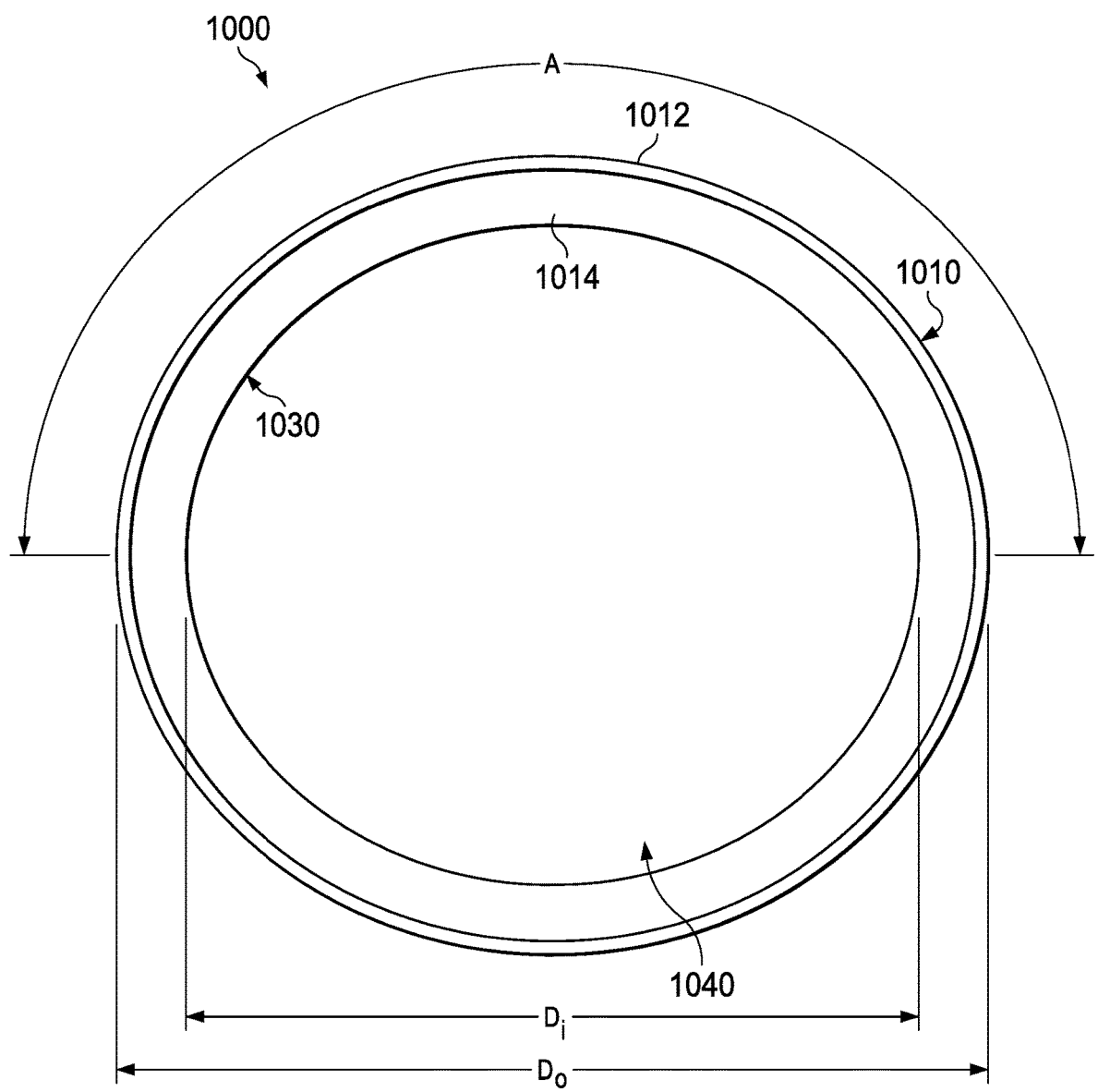

FIGS. 10-11 illustrate a variation of the first style of edge breather. In this embodiment, an edge breather 1000 includes a circular/elliptical cross-section. FIG. 10 illustrates a perspective view of edge breather 1000, and FIG. 11 illustrates a side view of edge breather 1000 in the direction of view lines 11-11 in FIG. 10. Edge breather 1000 includes a body 1002 with ridges 1012 (each defining an arc (A), furrows 1014, and holes 1016. Air flow 1050 flows from holes 1016 to hollow interior 1040. Edge breather 1000 further includes a lengthwise axis 1018, an inner surface 1030, and an outer surface 1010. While edge breather 1000 is shown as a circular ellipse in FIGS. 10-11, eccentric ellipses (e.g., ellipses that are wider than they are tall) may also be utilized as desired to facilitate the curing process for a part 140.

Figures 12, 13:
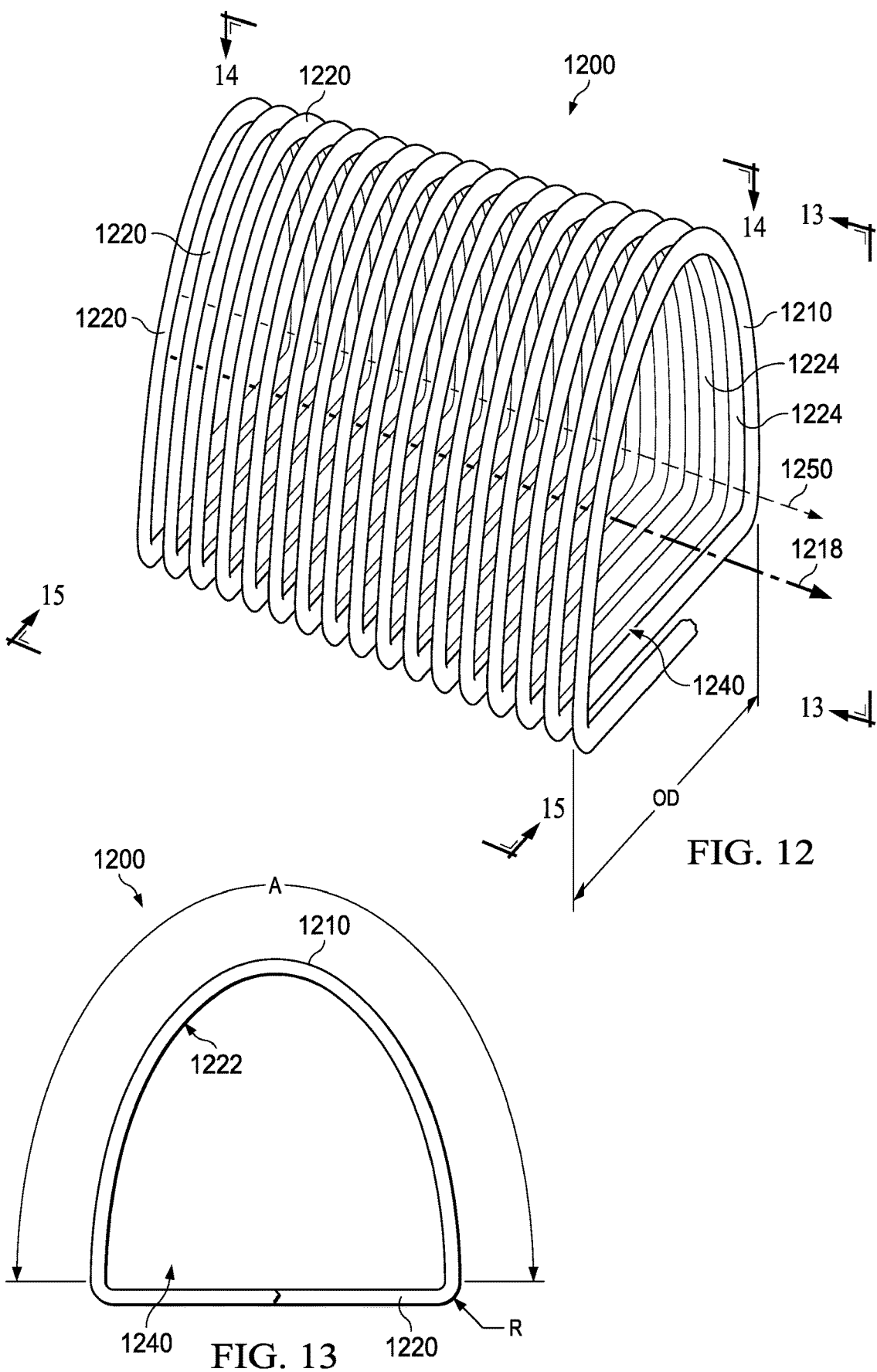
FIGS. 12-15 are illustrations of a second style of an edge breather in accordance with an illustrative embodiment.
Figure 14:
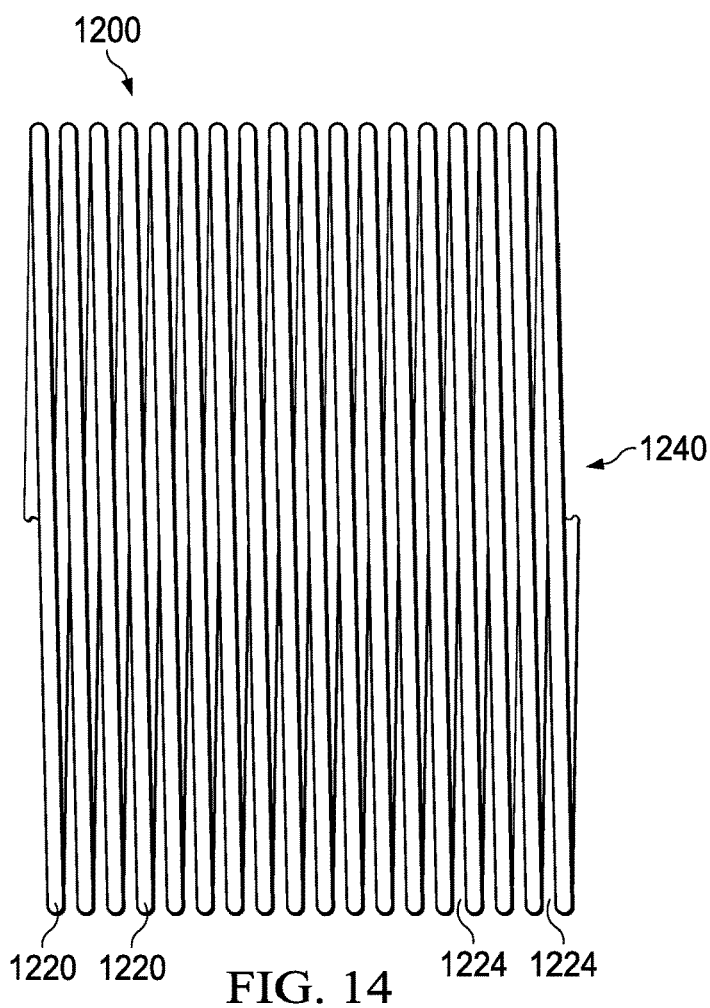
Figure 15:
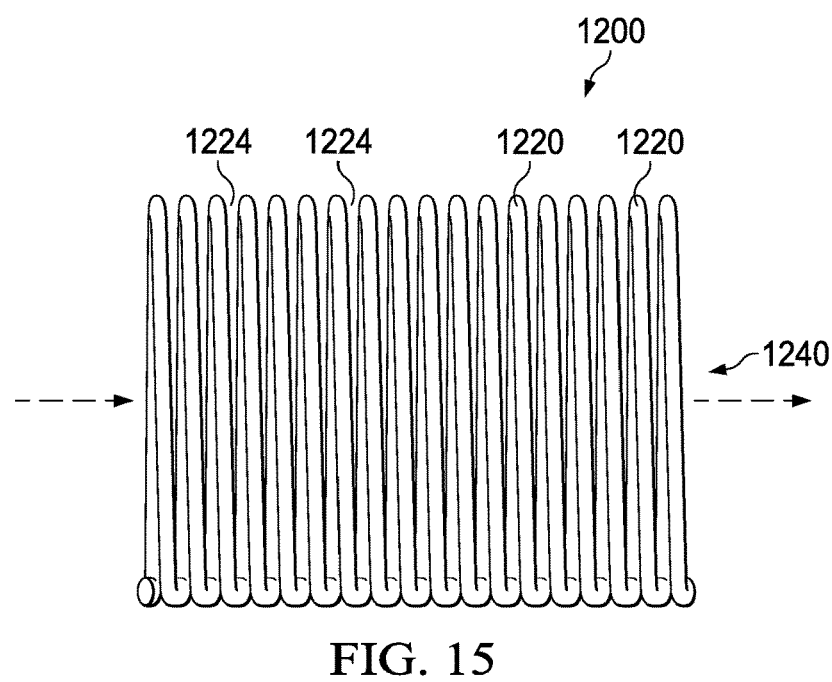

FIGS. 12-15 illustrate a second style of edge breather 1200 formed from a helical coil spring that can withstand the heat and pressure of an autoclave curing process in an illustrative embodiment. FIG. 12 illustrates a perspective view of edge breather 1200. FIG. 13 illustrates a front view of a winding 1220 of edge breather 1200 shown in the direction of view lines 13-13 in FIG. 12. FIG. 14 illustrates a top view of edge breather 1200 shown in the direction of view lines 14-14 in FIG. 12. FIG. 15 illustrates a side view of edge breather 1200 shown in the direction of view lines 15-15 in FIG. 12.

Edge breather 1200 comprises multiple windings 1220 of a strand of wire 1210. Each winding 1220 has a cross-section with a hollow interior 1240, as shown in FIGS. 12-13. As used herein, a winding 1220 is one complete circumferential wrapping of wire 1210 about hollow interior 1240. Each winding 1220 forms a ridge 1222 that includes an arc (A), which is substantially perpendicular to a lengthwise axis 1218 of edge breather 1200. Each arc (A) resists crushing forces applied to edge breather 1200 by vacuum bag 120 during manufacturing of a composite part (e.g., part 140). Openings/gaps 1224 between windings 1220 enable air to freely enter and leave edge breather 1200. In this embodiment, each winding 1220 is in the shape of a "D" with rounded corners, although other geometries (e.g., circular, elliptical, etc.) are suitable for windings and/or cross sections of edge breather 1400. Each winding of edge breather 1200 includes rounded corners (R) which each exhibit corner radii that are selected to prevent rupturing or snagging a vacuum bag when curing a composite part.

Since edge breather 1200 is a coil spring, edge breather 1200 remains substantially flexible along its length and can lay/conform against curving and complex edge geometries. In further embodiments, the cross section defined by winding 1220 may vary in shape as desired. For example, windings 1220 may be elliptical or circular if desired.

Each winding 1220 of coil spring 1200 may touch adjacent windings 1220 of coil spring 1200. Since the windings 1220 are touching via contact force and are not sealed (or in some embodiments are not even touching), small gaps 1224 between the windings enable air to flow into and out of coil spring 1200 during the curing of part 140. In short, air and volatile gases may travel freely into edge breather 1200 through the spaces between windings 1220.

Wire 1210 includes a Wire Diameter (WD). Each winding 1220 of wire 1210 includes an Outer Diameter (OD). WD may be selected as a substantially small value with respect to OD to ensure that coil spring 1200 remains flexible along its length. For example, WD and OD may be selected so that OD is at least twice as large as WD.

Larger wire diameters are more rigid than smaller wire diameters, and hence may become inflexible when edge breather 1200 is conformed to a tight curve radius (e.g., a curve radius of three inches). Choosing a smaller wire diameter such as fifty thousandths of an inch ensures that edge breather 1200 remains flexible along its length. In one embodiment, it may be beneficial to choose a wire diameter that is one hundred times smaller than the length of edge breather 1200. For example, in an embodiment relating to composite parts that are tens of feet in length (e.g., a wing of an aircraft), dimension OD may comprise three eighths of an inch, and dimension WD may comprise fifty thousandths of an inch. This size ensures that air flow 1250 through edge breather 1200 is not restricted, while also ensuring that a vacuum bag covering edge breather 1200 will not tear or rip.

The edge breathers described herein may be manufactured from any suitable materials, such as metal, three-dimensional (3D) printing materials, plastics, etc. However, in some embodiments materials are chosen for their capability to resist a loss of strength when exposed to the high temperatures and pressures involved in autoclave curing for composite parts (e.g., hundreds of degrees, at one or more atmospheres of pressure).

Figure 16:
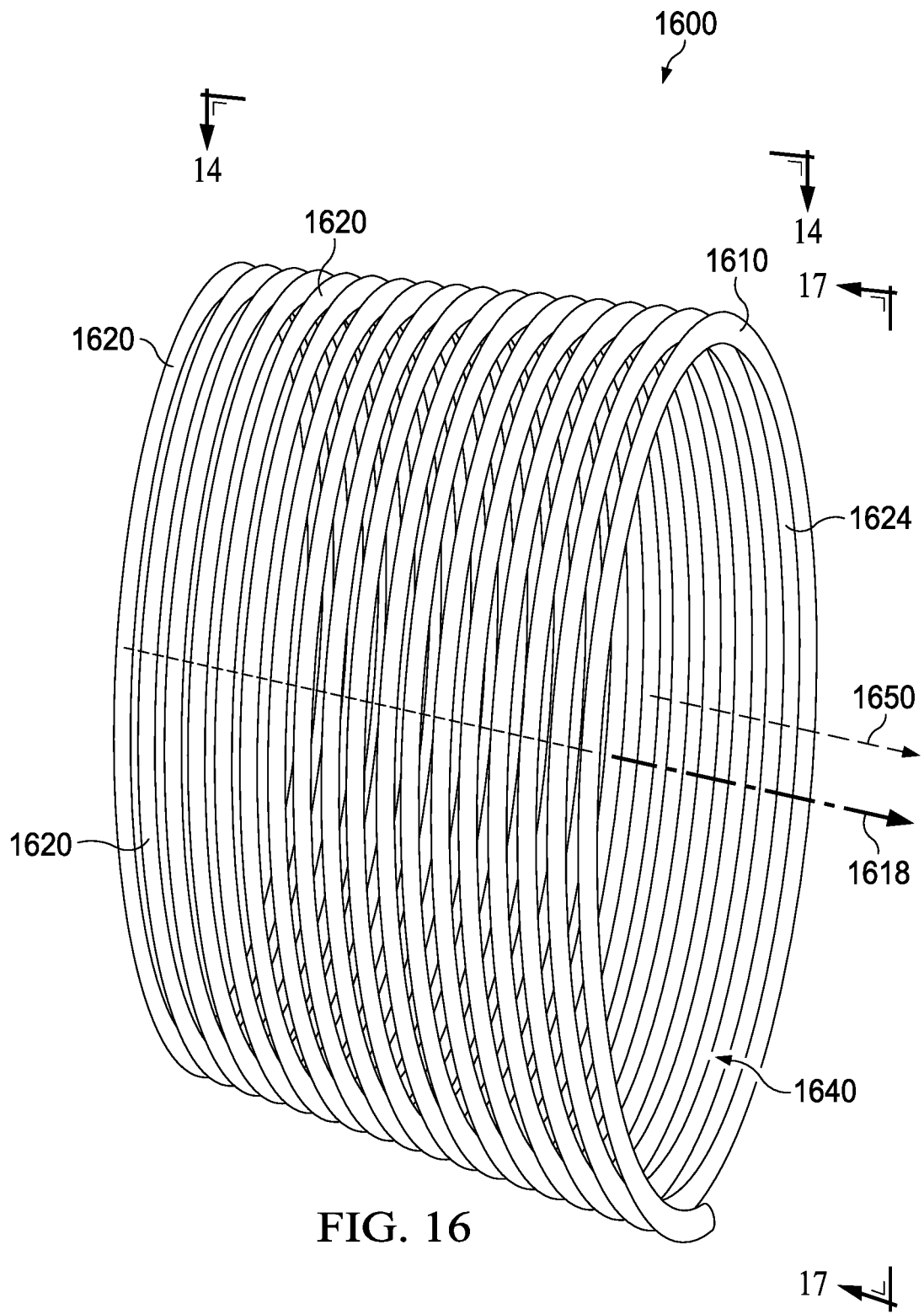
FIGS. 16-17 are illustrations of a variation of a second style of an edge breather in accordance with an illustrative embodiment.
Figure 17:
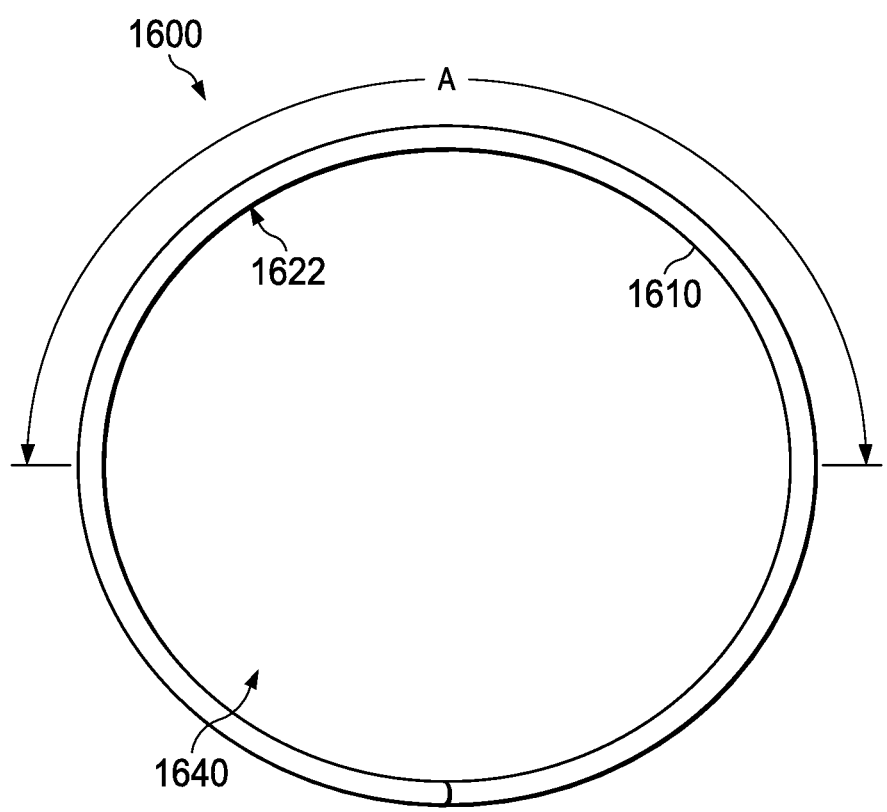

FIGS. 16-17 illustrate a variation of the second style of edge breather. In this embodiment, edge breather 1600 includes a circular/elliptical cross-section. FIG. 16 illustrates a perspective view of edge breather 1600, and FIG. 17 illustrates a front view of edge breather 1600 in the direction of view lines 17-17 in FIG. 16. Edge breather 1600 includes wire 1610 formed into windings 1620 that each include ridge 1622 defining an arc (A). Air flow 1650 flows from gaps 1624 through windings 1620 into hollow interior 1640. Edge breather 1600 further includes lengthwise axis 1618.

Edge breathers in accordance with the embodiments described in FIGS. 6-17 may be referred to as "rigid breathers" due to their strength and tolerance for heat and pressure. Reference to "rigid breathers," as used herein, may encompass any version of the embodiments described with reference to FIGS. 6-17, as well as additional shapes and configurations contemplated by those skilled in the art.

Figure 18:
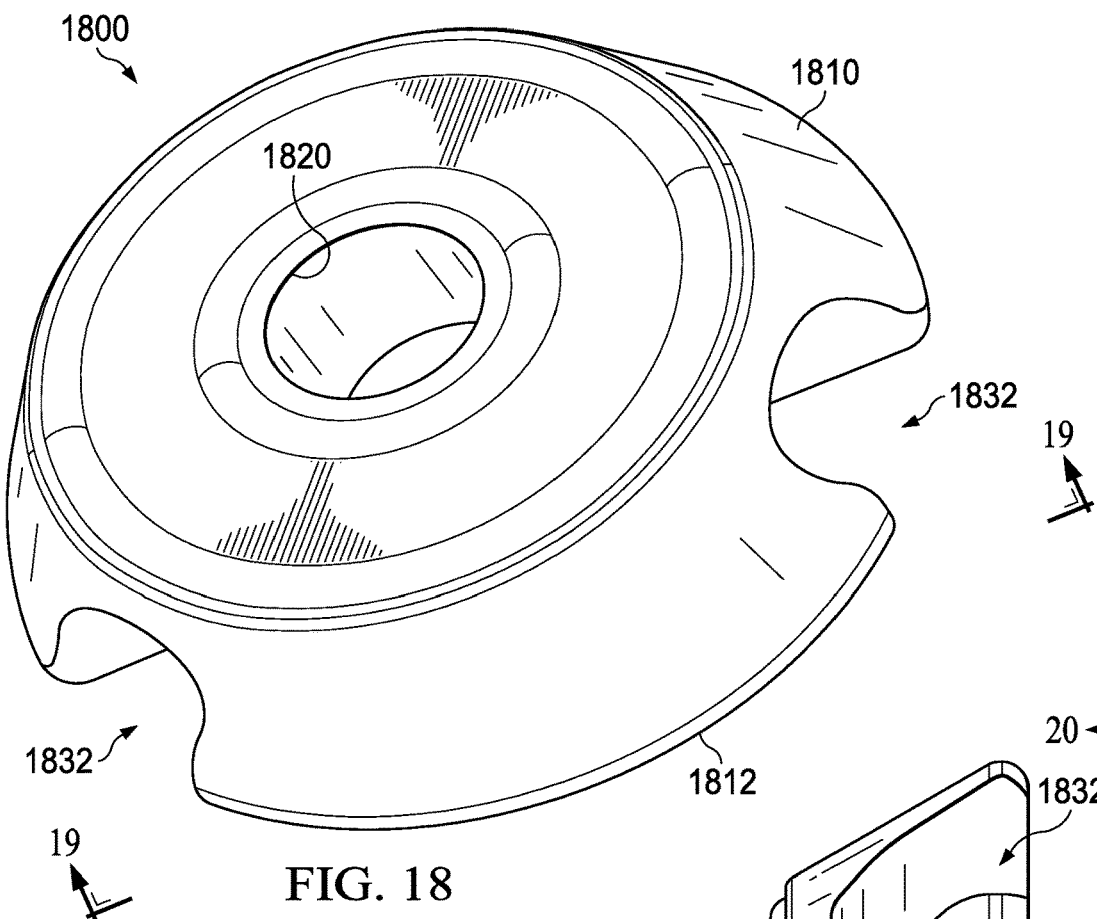
FIGS. 18-21 are illustrations of a vacuum port for drawing air out of an edge breather in accordance with an illustrative embodiment.
Figure 19:
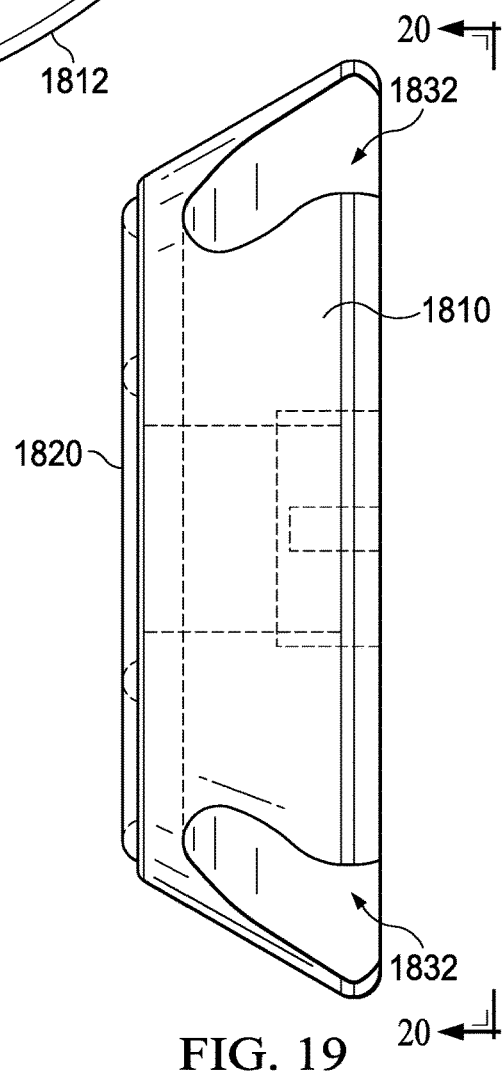
Figure 20:
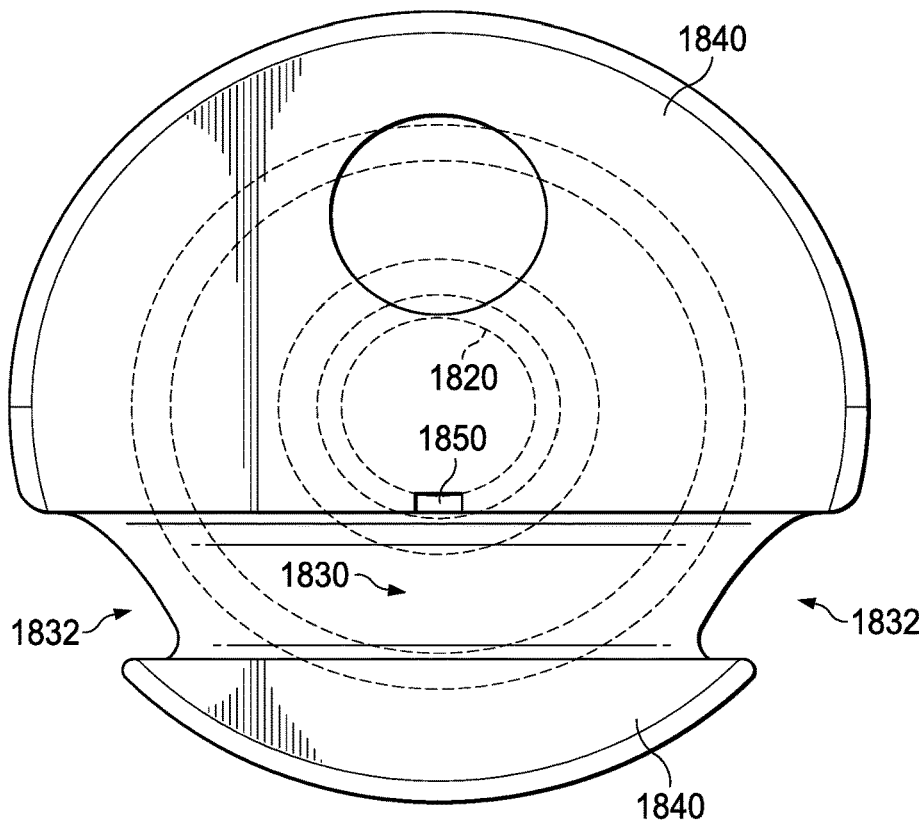
Figure 21:
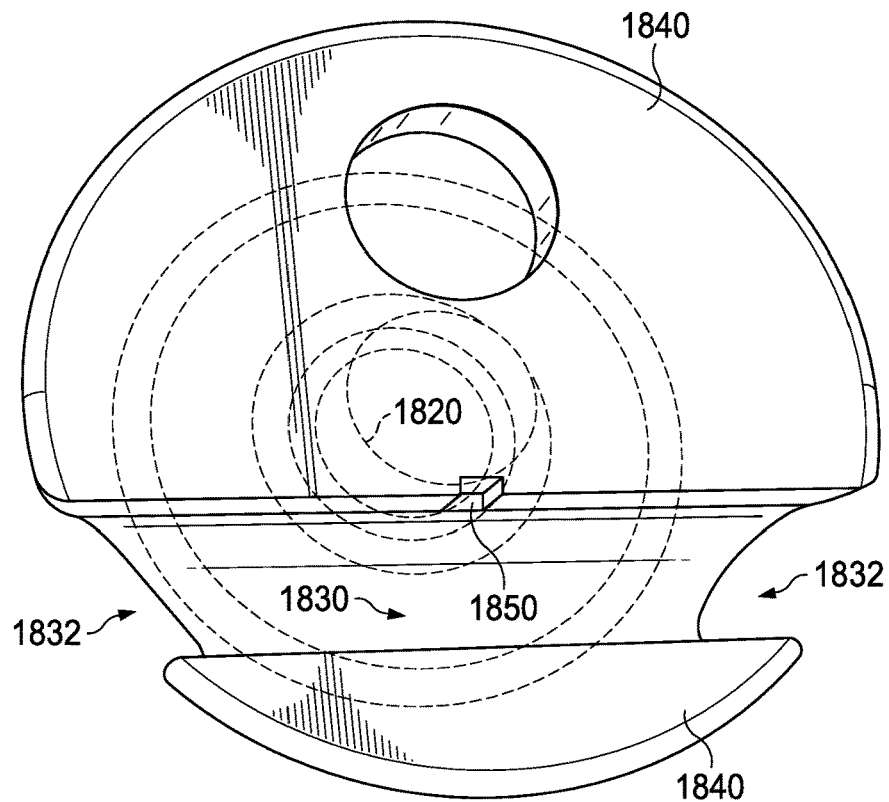

FIGS. 18-21 illustrate vacuum port 1800 for drawing air out of an edge breather (e.g., any of the edge breathers discussed above) in an illustrative embodiment. FIG. 18 is a perspective view, FIG. 19 is a side view shown in the direction of lines 19-19, FIG. 20 is a bottom view shown in the direction of lines 20-20, and FIG. 21 is an additional perspective view. Port 1800 is designed to lay atop one of the edge breathers described above, without pinching or crushing such an edge breather. Port 1800 may also be referred to as a vacuum port base, a port base, a base, or some other term used by one skilled in the art.

In this embodiment, port 1800 includes port body 1810, which is substantially rounded to ensure that vacuum bag 120 placed over port 1800 will not tear or rip during the curing process. Port body 1810 includes vacuum fitting 1820 for attachment to vacuum line 160. Port body 1810 also includes one or more openings 1832 along a sidewall edge 1812. Openings 1832 serve as endpoints of passageway 1830.

Passageway 1830 is dimensioned to cover one of the edge breathers described above without compressing the edge breather, and passageway 1830 cuts through bottom portion 1840 of vacuum port 1800. Passageway 1830 may also be referred to as a channel.

An edge breather may be inserted into port 1800 via passageway 1830, or port 1800 may be placed atop the edge breather (e.g., without compressing the edge breather or otherwise blocking air flow). Passageway 1830 is illustrated as being linear, but in further embodiments may be curved about fitting 1820 as desired. In further embodiments, passageway 1830 includes only one opening 1832, and port 1800 operates as a terminus for the edge breather.

Bottom portions 1840 couple port 1800 to tool 110. For example, bottom portions 1840 may be magnetic and designed to physically attach port 1800 to tool 110, may comprise weighted components to ensure that port 1800 does not drift/slide during the curing process, etc. Port 1800 also defines channel 1850, through which air may travel freely from the edge breather out through vacuum line 160 (as shown in FIG. 1).

Figure 22:
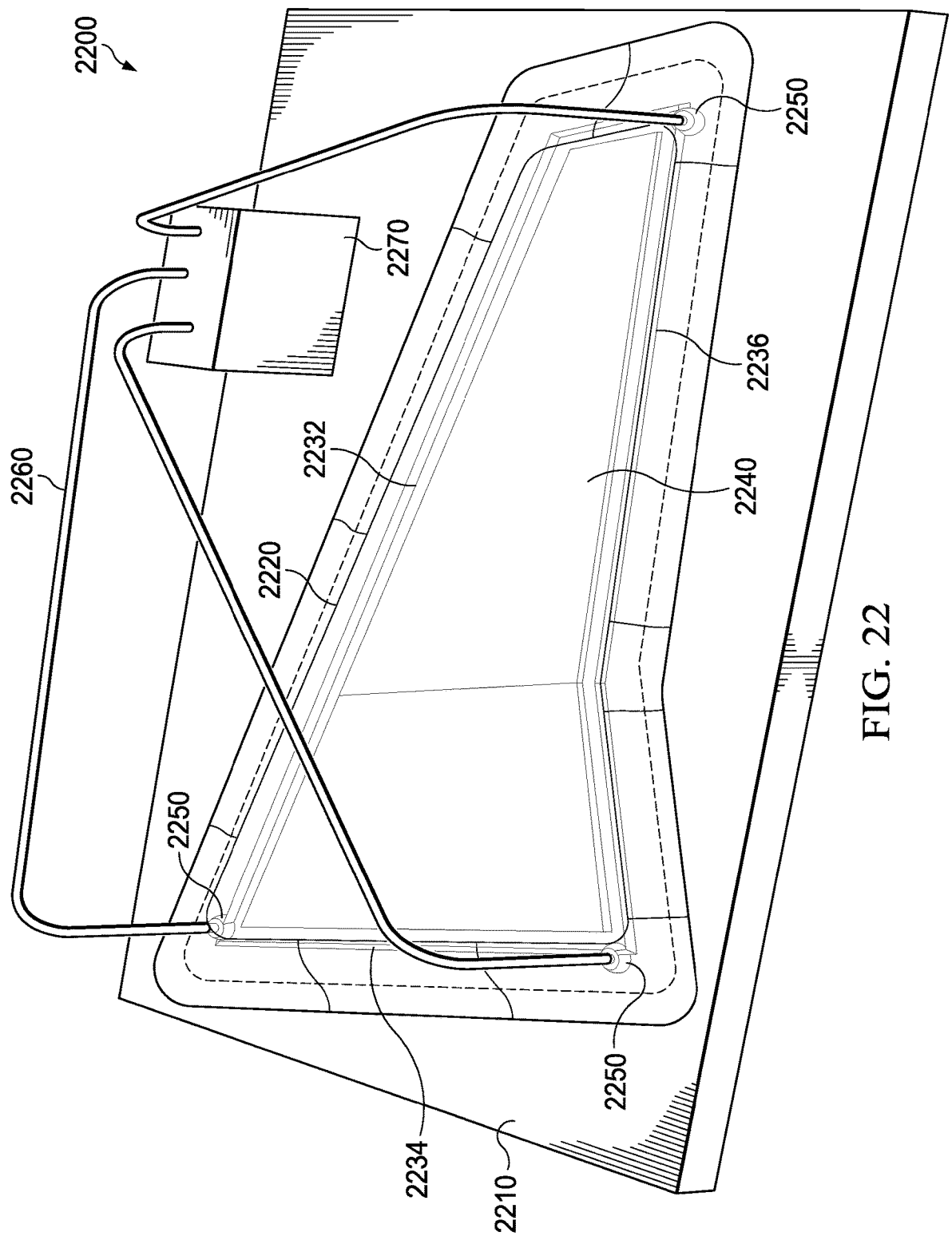
FIG. 22 is an illustration of a complete vacuum bag manufacturing system in accordance with an illustrative embodiment.

FIG. 22 is a diagram of a complete vacuum bag manufacturing system 2200 in an illustrative embodiment. System 2200 includes the enhanced edge breathers and vacuum ports discussed above. In this embodiment, part 2240 is laid-out on tool 2210 for curing. Edge breathers 2232, 2234, and 2236 are placed along the edge of part 2240, and are connected to vacuum ports 2250, which penetrate vacuum bag 2220. Compressor 2270 draws air out via vacuum lines 2260, which results in air traveling via the edges of part 2240 to edge breathers (2232, 2234, 2236) and out through ports 2250.

Figure 23:
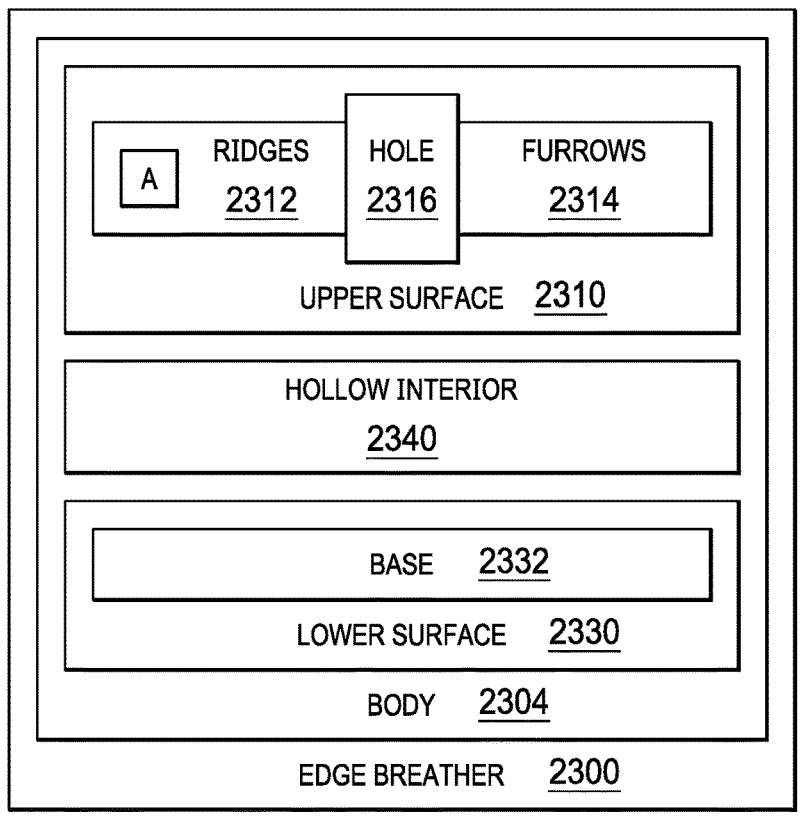
FIG. 23 is an illustration of a block diagram of an edge breather in accordance with an illustrative embodiment.

FIG. 23 is a block diagram of an edge breather 2300 in an illustrative embodiment. FIG. 23 illustrates that edge breather 2300 includes body 2302. Body 2302 comprises lower surface 2330, which includes base 2332. Edge breather 2300 also includes upper surface 2310, which includes ridges 2312, furrows 2314, and hole 2316. Hole 2316 penetrates into interior 2340. Interior 2340 is bounded by ridges 2312, furrows 2314, and base 2332. In this embodiment, each ridge 2312 defines an arc (A).

Figure 24:
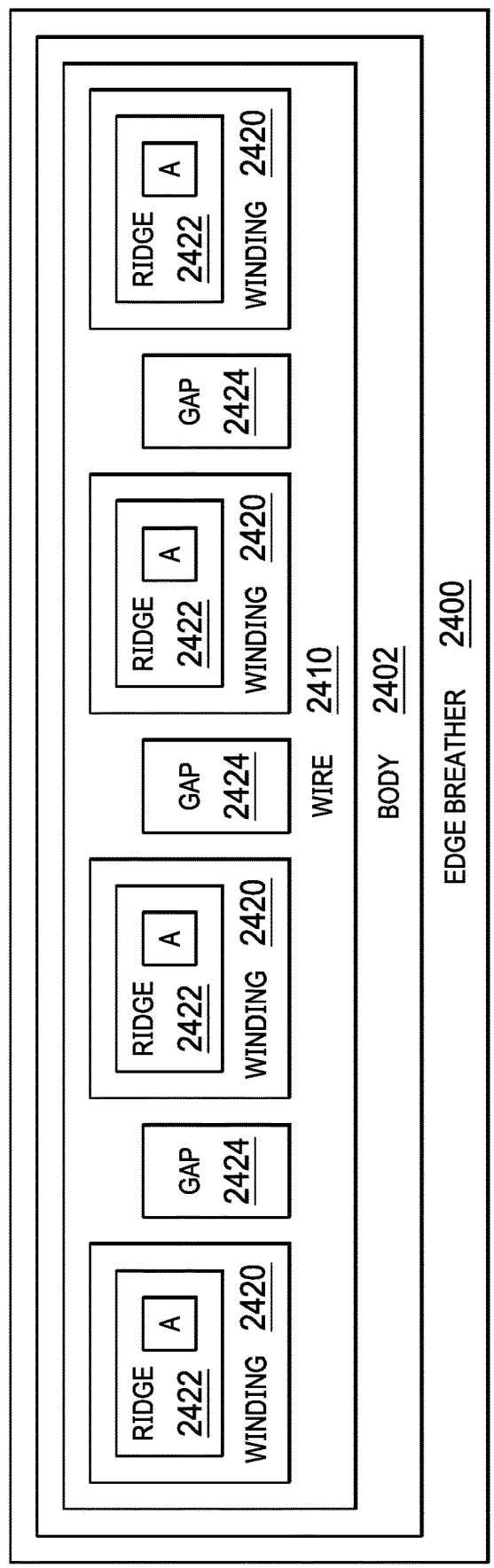
FIG. 24 is an illustration of a block diagram of an edge breather in accordance with an illustrative embodiment.

FIG. 24 is a block diagram of a further edge breather 2400 in an illustrative embodiment. In this embodiment, edge breather 2400 includes body 2402. Body 2402 includes wire 2410, which is wound into multiple windings 2420. Each winding 2420 includes a ridge 2422, which defines an arc (A). Arcs (A) are dimensioned to resist crushing pressure applied by a vacuum bag to edge breather 2400 during composite manufacturing processes. Gaps 2424 are disposed between each winding, enabling air to enter body 2402.

Figure 25:
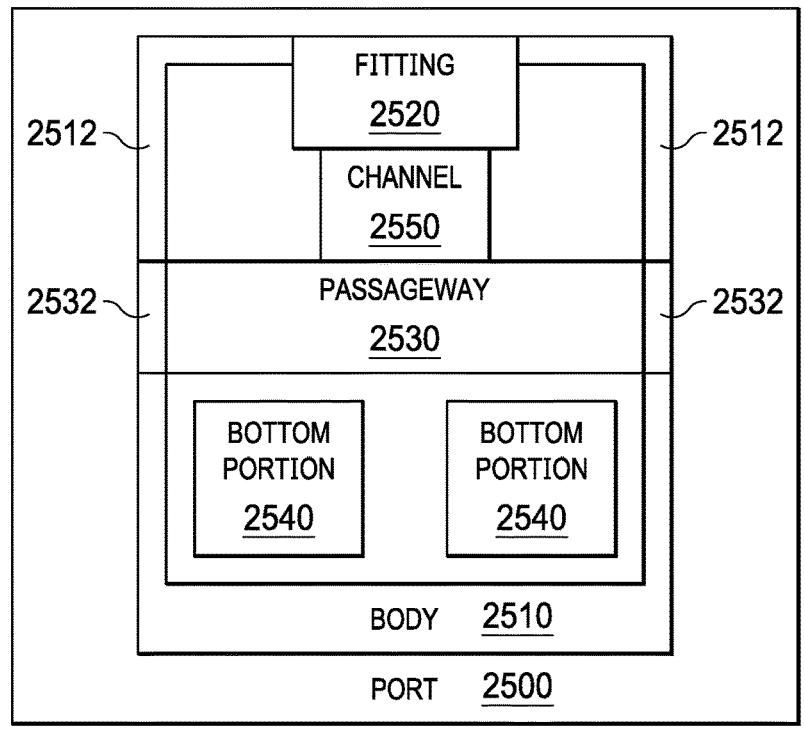
FIG. 25 is an illustration of a block diagram of a vacuum port in accordance with an illustrative embodiment.

FIG. 25 is a block diagram of vacuum port 2500 in an illustrative embodiment. In this embodiment, port 2500 includes a body 2510. Body 2510 includes an edge 2512, through which openings 2532 penetrate. Passageway 2530 is bounded on either side by openings 2532, and is dimensioned to receive a rigid edge breather without crushing the rigid edge breather.

Passageway 2530 is coupled with fitting 2520 via channel 2550. Channel 2550 is hollow. Channel 2550 enables air to flow between an edge breather in passageway 2530 and fitting 2520. Port 2500 also comprises bottom portions 2540, which may be used to magnetically couple vacuum port 2500 with a composite manufacturing tool.

Figure 26:
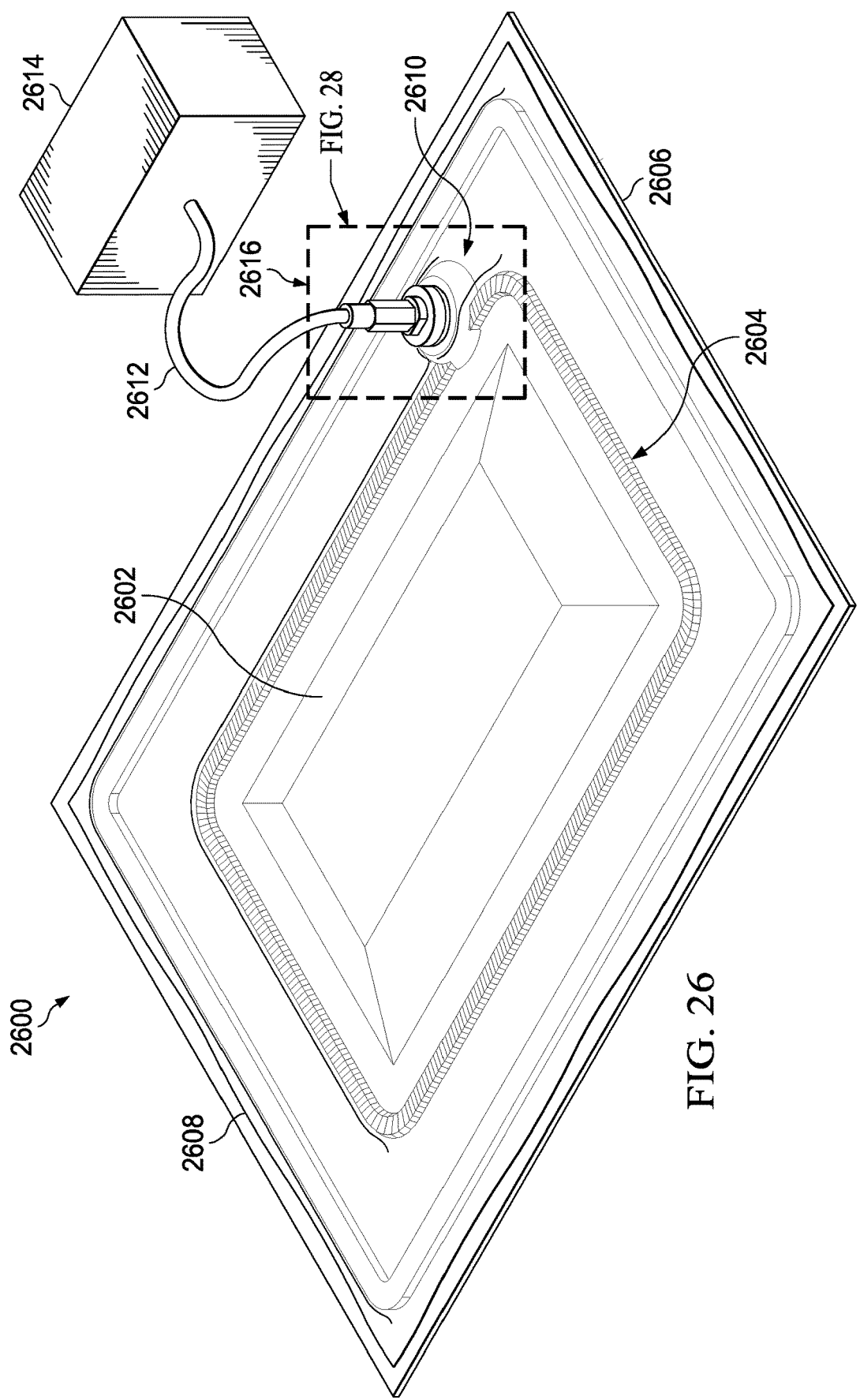
FIG. 26 is an illustration of a perspective view of a composite structure manufacturing system in accordance with an illustrative embodiment.

In FIG. 26, an illustration of a perspective view of a composite structure manufacturing system is depicted in accordance with an illustrative embodiment. Composite structure manufacturing system 2600 is an alternative implementation for vacuum bag system 100 shown in FIG. 1. Composite structure manufacturing system 2600 also comprises a combination of components and/or devices capable of employing vacuum bag techniques to consolidate and cure layers of composite material 2602.

In this illustrative example, composite structure manufacturing system 2600 comprises breather system 2604, tool 2606, vacuum bag 2608, port system 2610, vacuum line 2612, and compressor 2614. Layers of composite material 2602 have been laid up in a desired manner on tool 2606 in this illustrative example. Vacuum bag 2608 and breather system 2604 hold the uncured layers in place. When a vacuum is drawn on composite structure manufacturing system 2600, gases are evacuated from layers of composite material 2602.

Unlike edge breathers 130, 132, 134, and 136 shown as separate sections in FIGS. 1-5, breather system 2604 comprises a single continuous edge breather in this illustrative example. Section 2616 of composite structure manufacturing system 2600 highlights port system 2610. Components in section 2616 are shown in greater detail in FIG. 28.

Figure 27:
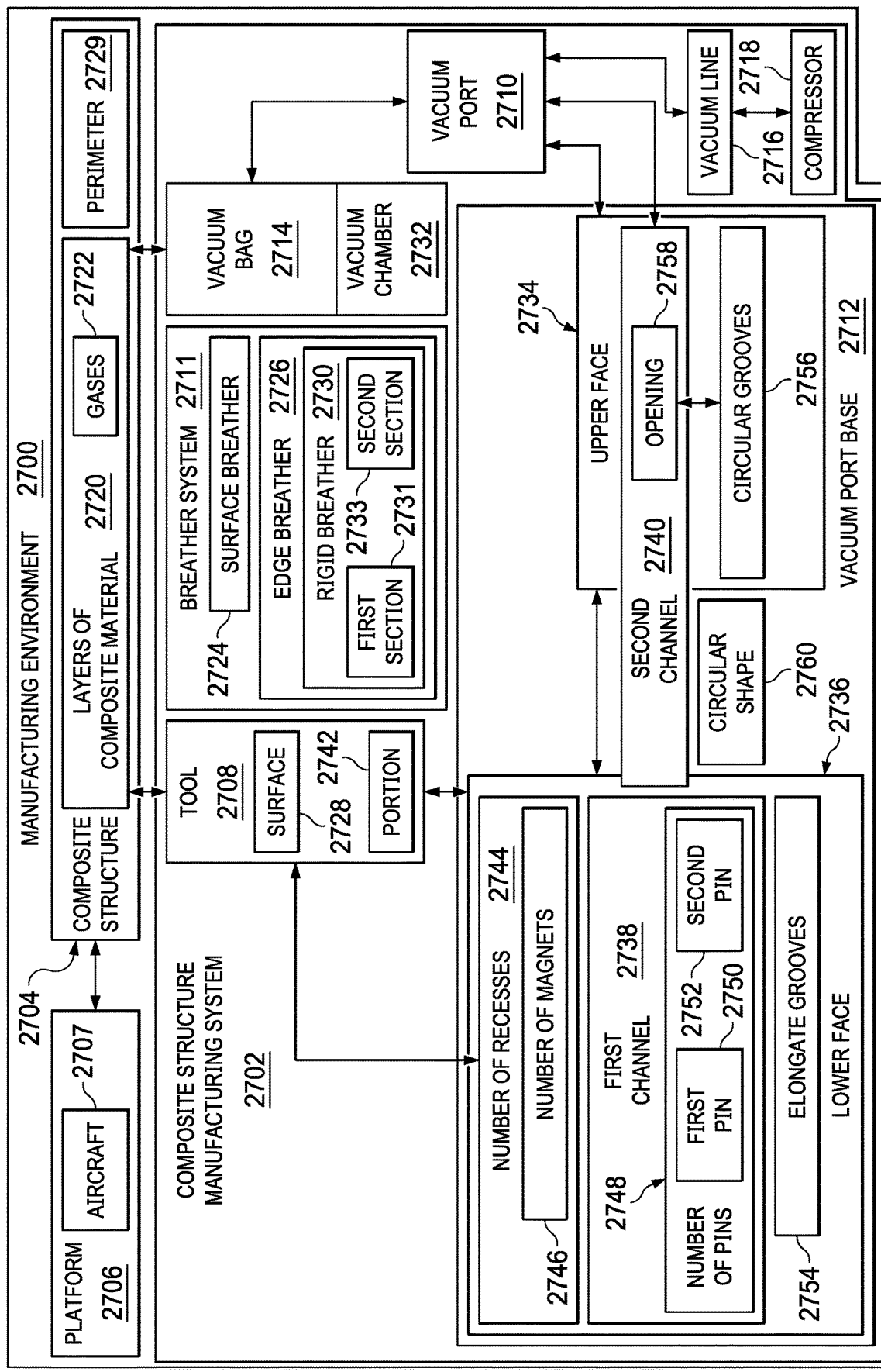
FIG. 27 is an illustration of a block diagram of a manufacturing environment in accordance with an illustrative embodiment.

Turning now to FIG. 27, an illustration of a block diagram of a manufacturing environment is depicted in accordance with an illustrative embodiment. Manufacturing environment 2700 is an environment where components within composite structure manufacturing system 2702 may be used to manufacture composite structure 2704. Specifically, components within composite structure manufacturing system 2702 may be used to cure composite structure 2704.

Composite structure 2704 is a structure configured for use in platform 2706. Platform 2706 may be, for example, without limitation, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 2706 takes the form of aircraft 2707 in this illustrative example. When composite structure 2704 is manufactured for aircraft 2707, composite structure 2704 may take the form of, for example, without limitation, a wing, a horizontal stabilizer, a vertical stabilizer, a nacelle, a housing, a bin, a panel, or some other suitable structure configured for use in aircraft 2707.

As depicted, composite structure manufacturing system 2702 comprises tool 2708, vacuum port 2710, breather system 2711, vacuum port base 2712, vacuum bag 2714, vacuum line 2716, and compressor 2718. Tool 2708 is a rigid structure for forming composite structure 2704. During manufacturing of composite structure 2704, layers of composite material 2720 are laid up on tool 2708 in a desired manner. Layers of composite material 2720 are held in place on tool 2708 using vacuum bag 2714 during curing.

Prior to being cured, layers of composite material 2720 may contain gases 2722. Gases 2722 may take the form of air, volatile gases, or some other type of gas. If left between or within layers of composite material 2720, gases 2722 may cause undesired porosity or other defects in composite structure 2704. To minimize such defects, manufacturing processes attempt to eliminate or substantially reduce gases 2722 from layers of composite material 2720.

In this illustrative example, breather system 2711 is used during the curing process to enhance elimination of gases 2722 from layers of composite material 2720 when under vacuum. Breather system 2711 provides passageways for gases 2722 to travel from layers of composite material 2720 within vacuum bag 2714. Gases 2722 then exit vacuum bag 2714 via vacuum port 2710, which operates as a fitting for vacuum line 2716. Vacuum line 2716 is powered by compressor 2718 in this illustrative example.

Breather system 2711 includes surface breather 2724 and edge breather 2726. Surface breather 2724 is positioned over the uncured composite material and provides a passageway for gases 2722 to exit through the surface of the uncured composite material.

In this illustrative example, edge breather 2726 is positioned on top of surface 2728 of tool 2708 and proximate to layers of composite material 2720. Edge breather 2726 may be positioned around perimeter 2729 of uncured composite structure 2704 (layers of composite material 2720). The proximity of edge breather 2726 to perimeter 2729 of layers of composite material 2720 may be selected to maximize elimination of gases 2722.

Edge breather 2726 resists pressure and heat during the curing process. Edge breather 2726 also defines internal passageways that gases 2722 through which air and other gases may be drawn out of layers of composite material 2720.

Edge breather 2726 may be comprised of various types of materials. For example, without limitation, edge breather 2726 may be comprised of nylon, polyester, fiberglass, and other suitable materials with varying weaves and weights. When such materials are used, edge breather 2726 may be a single-use breather. In other words, edge breather 2726 cannot be used a second time to aid in curing a composite structure.

Edge breather 2726 may also take the form of rigid breather 2730 in some illustrative examples. Unlike consumable breathers, rigid breather 2730 is reusable. Edge breathers, described with reference to FIGS. 6-17, are examples of physical implementations for rigid breather 2730 shown in block form in this figure. In addition, rigid breather 2730 may take the form of an edge breather as described in patent application Ser. No. 14/936,870, filed on Nov. 10, 2015, entitled "Edge Breathers for Composite Products," now U.S. Pat. No. 10,220,605, issued Mar. 5, 2019, the features and function of which are incorporated herein by reference.

As depicted, rigid breather 2730 comprises first section 2731 and second section 2733. Rigid breather 2730 also may have more than two sections. Each of these sections may be connected to one another to elongate rigid breather 2730 and maintain fluid communication between sections to expel gases 2722 from layers of composite material 2720.

As illustrated, vacuum port base 2712 is positioned on top of edge breather 2726 and tool 2708. Vacuum port base 2712 may be comprised of at least one of aluminum, iron, an iron alloy, steel, another type of metal, or some other suitable type of material.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Vacuum port base 2712 may be manufactured to have a low-profile configuration. Such configuration decreases the risk of tearing for vacuum bag 2714. For example, the thickness of vacuum port base 2712 may be based on its diameter. The air-path volume, thickness, and width is selected to be below current industry standard such that vacuum bag 2714 does not rip or bridge.

Vacuum port base 2712 comprises upper face 2734, lower face 2736, first channel 2738, and second channel 2740. Upper face 2734 is configured to interface with vacuum port base 2712. Lower face 2736 is configured to interface with surface 2728 of tool 2708.

First channel 2738 is formed in lower face 2736. First channel 2738 is configured to receive edge breather 2726. Passageway 1830 shown in FIG. 18, channel 2804 shown in FIG. 29, and channel 3408 shown in FIG. 34 may be implementations of first channel 2738 shown in block form in this figure.

Edge breather 2726 fits within first channel 2738 in a desired manner. In one example, edge breather 2726 may be clearance fit with first channel 2738. In another example, a gap may be present between edge breather 2726 and first channel 2738. First channel 2738 is configured to be in fluid communication with edge breather 2726 such that gases 2722 pass from edge breather 2726 into first channel 2738.

Second channel 2740 is formed within vacuum port base 2712, extending from upper face 2734 inward. Second channel 2740 meets first channel 2738 within the center of vacuum port base 2712. Second channel 2740 is configured to receive vacuum port 2710 such that vacuum port 2710 is in fluid communication with first channel 2738 and edge breather 2726 to remove gases 2722 from layers of composite material 2720 when forming composite structure 2704.

During curing, vacuum bag 2714 creates vacuum chamber 2732 around edge breather 2726, vacuum port base 2712, layers of composite material 2720, and portion 2742 of tool 2708. Vacuum bag 2714 may be taped or sealed to tool 2708 using at least one of a sealant, an adhesive, or some other suitable type of material in some illustrative examples.

Under vacuum, vacuum bag 2714 conforms to tool 2708 and edge breather 2726. As a result, layers of composite material 2720 are held tightly against the contours of tool 2708 as the part cures. Gases 2722 are drawn out of the system during the entire process. Additional pressure and/or heat also may be used. If rigid breather 2730 is used, rigid breather 2730 resists the heat and pressure to maintain a desired level of flow for gases 2722 out of the system.

In some implementations of an illustrative embodiment, vacuum port base 2712 may have number of recesses 2744 formed within lower face 2736. As used herein, "a number of," when used with reference to items, means one or more items. Thus, "a number of recesses" includes one or more recesses.

Number of recesses 2744 is configured to house number of magnets 2746 such that each magnet is flush against lower face 2736 and surface 2728 of tool 2708. Instead of using an adhesive to secure vacuum port base 2712, number of magnets 2746 is configured to magnetically attach vacuum port base 2712 to tool 2708.

Vacuum port base 2712 may have number of pins 2748 when rigid breather 2730 is used in an illustrative embodiment. Number of pins 2748 is associated with first channel 2738. For instance, number of pins 2748 may protrude from any portion of first channel 2738. Number of pins 2748 may be formed as part of vacuum port base 2712 or may be attached to vacuum port base 2712 before use in a curing system.

Each of number of pins 2748 is configured to engage with rigid breather 2730 to hold rigid breather 2730 in place. A pin within number of pins 2748 may be a tension pin, a dowel pin, or some other suitable type of pin. Other means of securing edge breather 2726 may be used, depending on the particular implementation.

As depicted, number of pins 2748 includes first pin 2750 and second pin 2752. When rigid breather 2730 is used in composite structure manufacturing system 2702, first pin 2750 engages with first section 2731 of rigid breather 2730. In a similar fashion, second pin 2752 engages with second section 2733 of rigid breather 2730 to connect first section 2731 to second section 2733 within first channel 2738.

In some illustrative examples, vacuum port base 2712 may have a number of grooves that aids in the flow of gases 2722. For example, elongate grooves 2754 may be formed in lower face 2736 and run radially from second channel 2740 toward an edge of lower face 2736 of vacuum port base 2712.

As another example, circular grooves 2756 may be formed within upper face 2734. Circular grooves 2756 may surround opening 2758 of second channel 2740.

Different implementations of vacuum port base 2712 may have different shapes. For instance, vacuum port base 2712 may have a circular shape, an elongate shape, a square shape with beveled edges, or some other suitable shape. In this illustrative example, vacuum port base 2712 has circular shape 2760 and lower face 2736 has a larger diameter than upper face 2734. In other illustrative examples, upper face 2734 may have the same or more surface area than lower face 2736.

With an illustrative embodiment, manufacturing of composite structure 2704 may take less time than with currently used systems. Vacuum port base 2712 is easily positioned over edge breather 2726 without any additional modifications of tooling or assembly systems. Vacuum port base 2712 provides a functional interface with tool 2708 and vacuum port 2710 that maintains fluid communication with edge breather 2726. Number of magnets 2746 may be used to cut down on consumables needed during the curing process. Because vacuum port base 2712 provides fluid communication with edge breather 2726, the number of ports may be reduced in composite structure manufacturing system 2702, further reducing cost and risk of vacuum bag 2714 tearing during curing. Flow rate of gases 2722 being expelled from layers of composite material 2720 is also increased with an illustrative embodiment.

Figure 28:
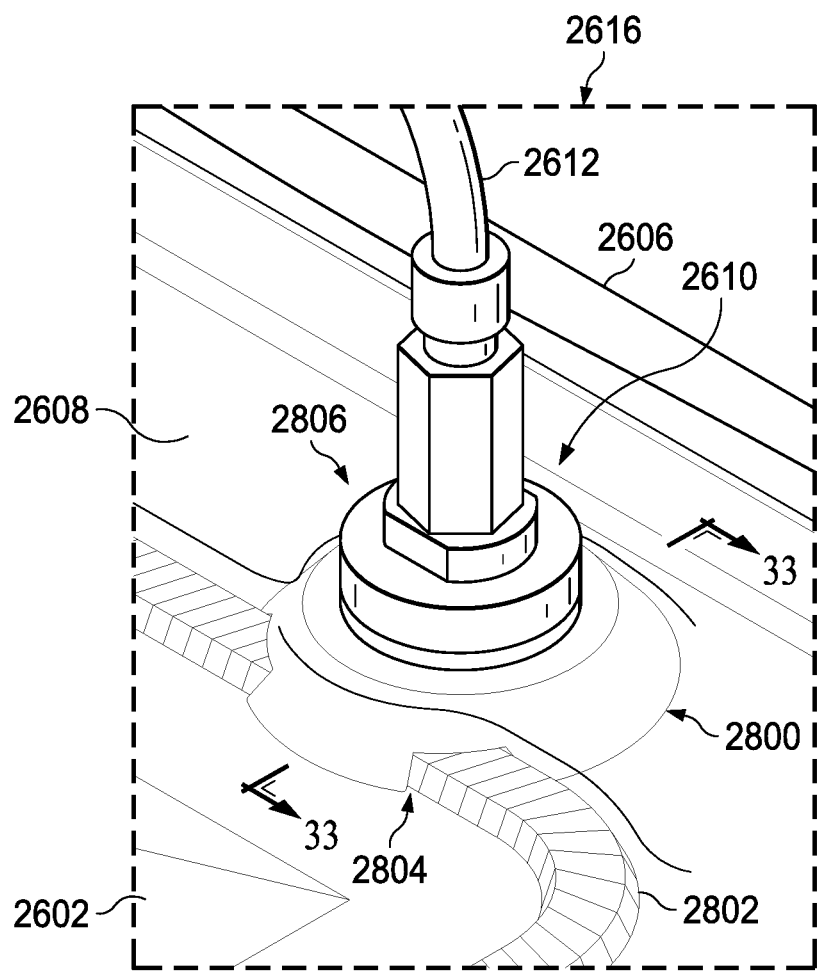
FIG. 28 is an illustration of a perspective view of a section of a composite structure manufacturing system in accordance with an illustrative embodiment.

With reference next to FIG. 28, an illustration of a perspective view of a section of a composite structure manufacturing system is depicted in accordance with an illustrative embodiment. FIG. 28 depicts a more-detailed view of section 2616 of composite structure manufacturing system 2702 shown in FIG. 26. FIG. 28 shows an example of one implementation of components within composite structure manufacturing system 2702 as shown in block form in FIG. 27.

As depicted, vacuum port base 2800 is positioned directly on top of tool 2606 and rigid breather 2802. Channel 2804 receives rigid breather 2802. A gap is present between the walls of channel 2804 and rigid breather 2802.

In this illustrative example, vacuum bag 2608 has been placed over vacuum port base 2800, rigid breather 2802, tool 2606 and layers of composite material 2602. Vacuum port 2806 is connected to vacuum port base 2800. Vacuum port 2806 comprises a number of components that secure vacuum line 2612 such that gases (not shown) may be drawn out of composite structure manufacturing system 2600 shown in FIG. 26. For instance, vacuum port 2806 may connect to vacuum port base 2800 using a three-quarter-turn locking feature. In other illustrative examples, vacuum port 2806 is secured to vacuum port base 2800 in some other manner.

A hole in vacuum bag 2608 (not shown) is made such that fluid communication is possible between vacuum line 2612 and rigid breather 2802. In this view, a vacuum has been drawn on the system, applying pressure against layers of composite material 2602.

Figure 29:
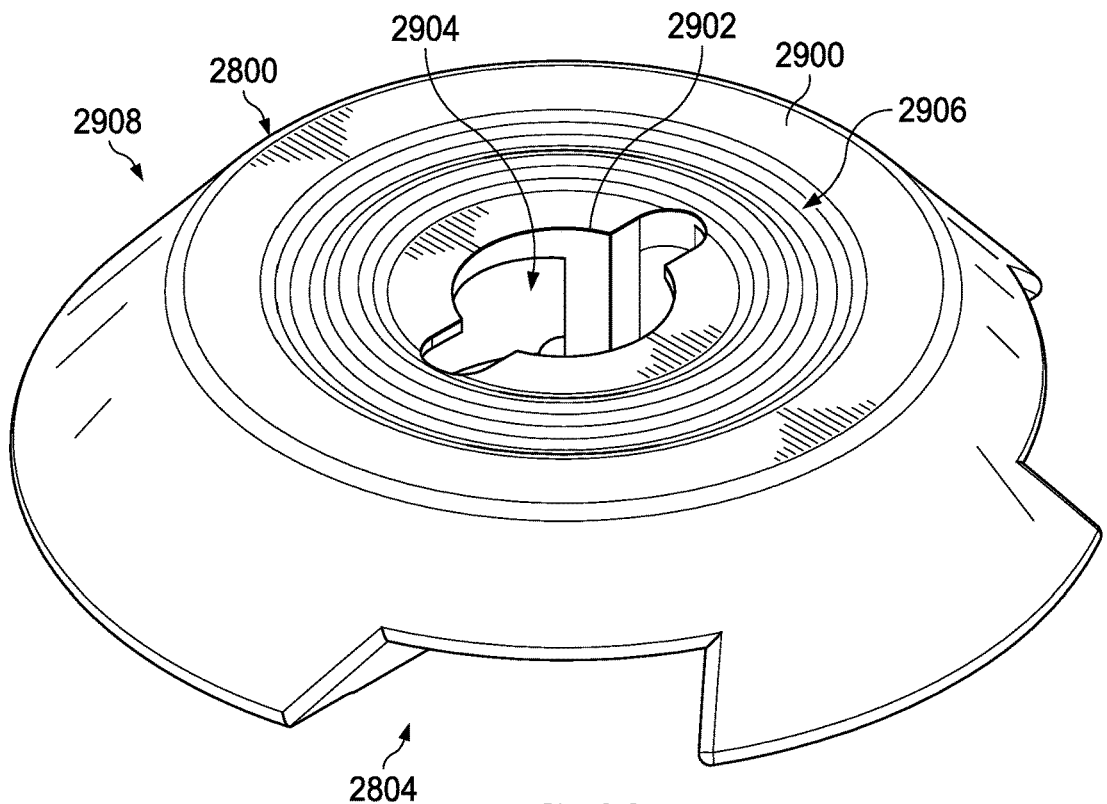
FIG. 29 is an illustration of a top perspective view of a vacuum port base in accordance with an illustrative embodiment.

Turning now to FIG. 29, an illustration of a top perspective view of a vacuum port base is depicted in accordance with an illustrative embodiment. A more-detailed view of vacuum port base 2800 from FIG. 28 is shown in this figure.

Vacuum port base 2800 has upper face 2900 with opening 2902. Upper face 2900 interfaces with vacuum port 2806. In this illustrative example, opening 2902 takes the shape of the component that secures vacuum port 2806 to vacuum port base 2800. In other words, the shape of channel 2904 is machined to receive a desired type of connection. The shape and size of channel 2904 may change based on the type of connection used to connect vacuum port base 2800 to vacuum line 2612 shown in FIG. 26. Other shapes for opening 2902 are contemplated, depending on the particular implementation. Channel 2904 is formed within vacuum port base 2800. Channel 2904 is designed to be in fluid communication with vacuum port 2806 and vacuum line 2612 (not shown in this view).

As depicted, channel 2804 is formed through the lower portion of vacuum port base 2800. Channel 2804 has a shape that conforms to the shape of rigid breather 2802 from FIG. 28. Channel 2904 and channel 2804 are in fluid communication with one another.

In this illustrative example, upper face 2900 also has circular grooves 2906. Circular grooves 2906 are formed around opening 2902. Circular grooves 2906 seal the system and prevent gas from escaping in an undesired manner. As illustrated, vacuum port base 2800 has circular shape 2908. Circular shape 2908 reduces vacuum bag tears because no jagged edges are present to inadvertently tear the bag.

Figure 30:
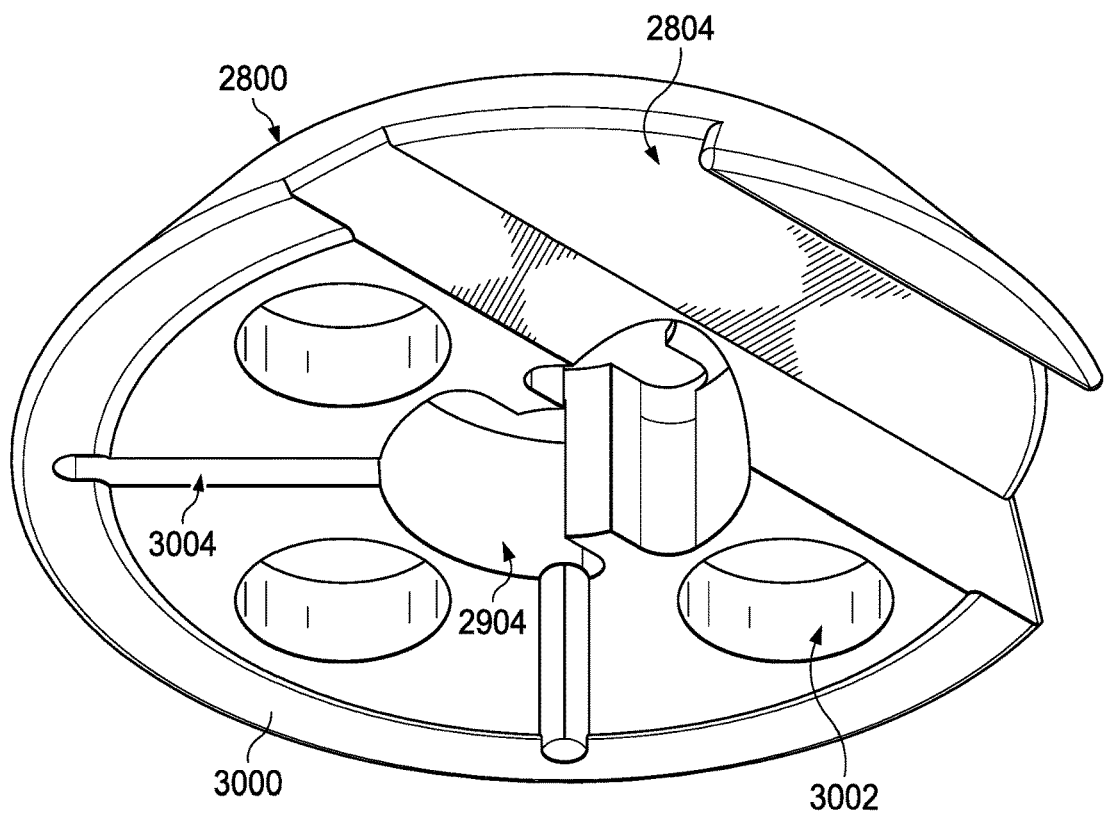
FIG. 30 is an illustration of a bottom perspective view of a vacuum port base in accordance with an illustrative embodiment.

With reference now to FIG. 30, an illustration of a bottom perspective view of a vacuum port base is depicted in accordance with an illustrative embodiment. Lower face 3000 of vacuum port base 2800 is shown in this view.

Channel 2804 is formed in lower face 3000. Recesses 3002 have also been formed in lower face 3000. Although three recesses are shown in recesses 3002, more or fewer recesses may be present. Recesses 3002 are configured to house magnets (not shown in this view) used to magnetically connect vacuum port base 2800 to tool 2606 from FIG. 26. Recesses 3002 may have various shapes and sizes, depending on the particular implementation.

As depicted, lower face 3000 also has elongate grooves 3004. Elongate grooves 3004 are in fluid communication with channel 2904 and extend radially from channel 2904 out to the edge of lower face 3000. Elongate grooves 3004 provide additional passageways for gases to travel from the layers of composite material to channel 2904 and out of the system. For example, elongate grooves 3004 may interface with a surface breather (not shown) and provide passageways to draw out gases from the surface breather.

Figure 31:
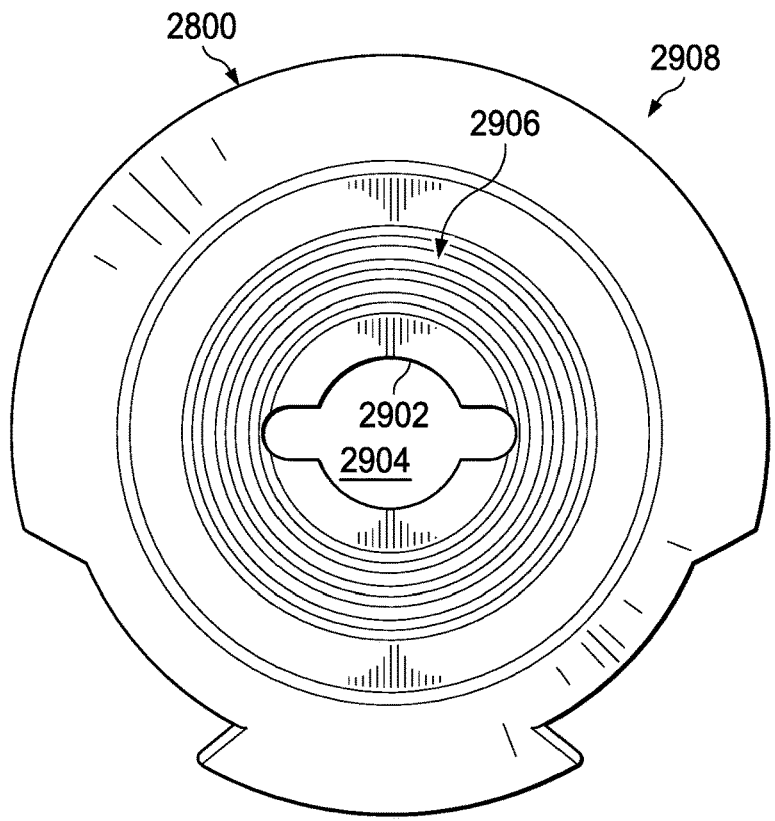
FIG. 31 is an illustration of a top view of a vacuum port base in accordance with an illustrative embodiment.
Figure 32:
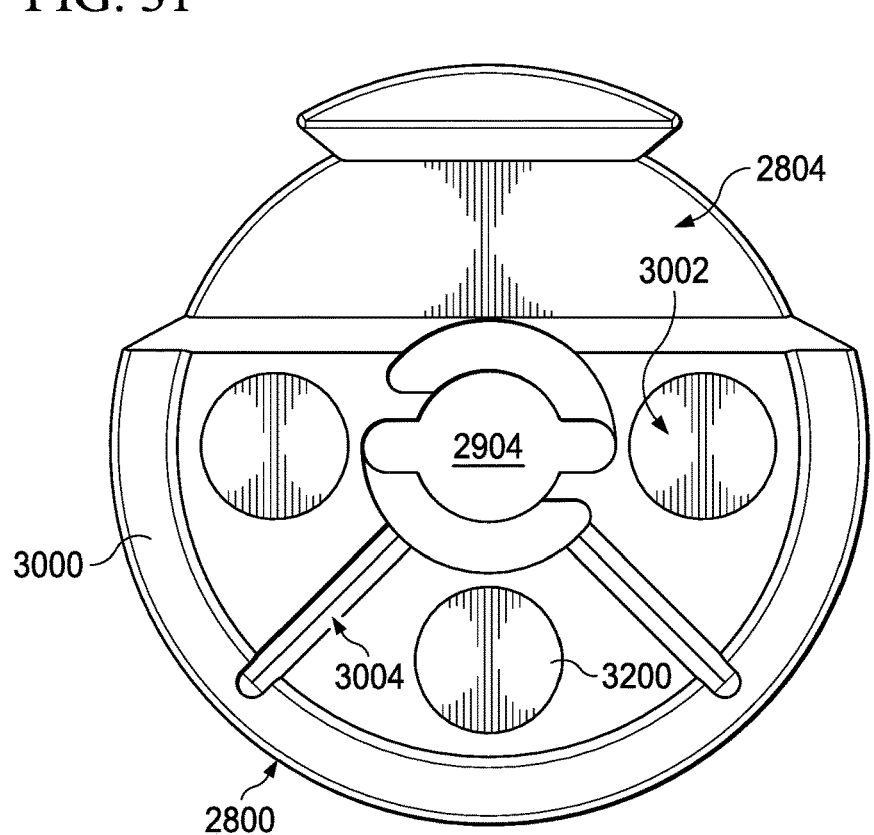
FIG. 32 is an illustration of a bottom view of a vacuum port base in accordance with an illustrative embodiment.

FIG. 31 and FIG. 32 show additional views of vacuum port base 2800. FIG. 31 is a top view while FIG. 32 is a bottom view. In FIG. 32, magnets 3200 have been placed in each of recesses 3002. Magnets 3200 have a shape similar to recesses 3002 and are magnetically held in place within recesses 3002.

Figure 33:
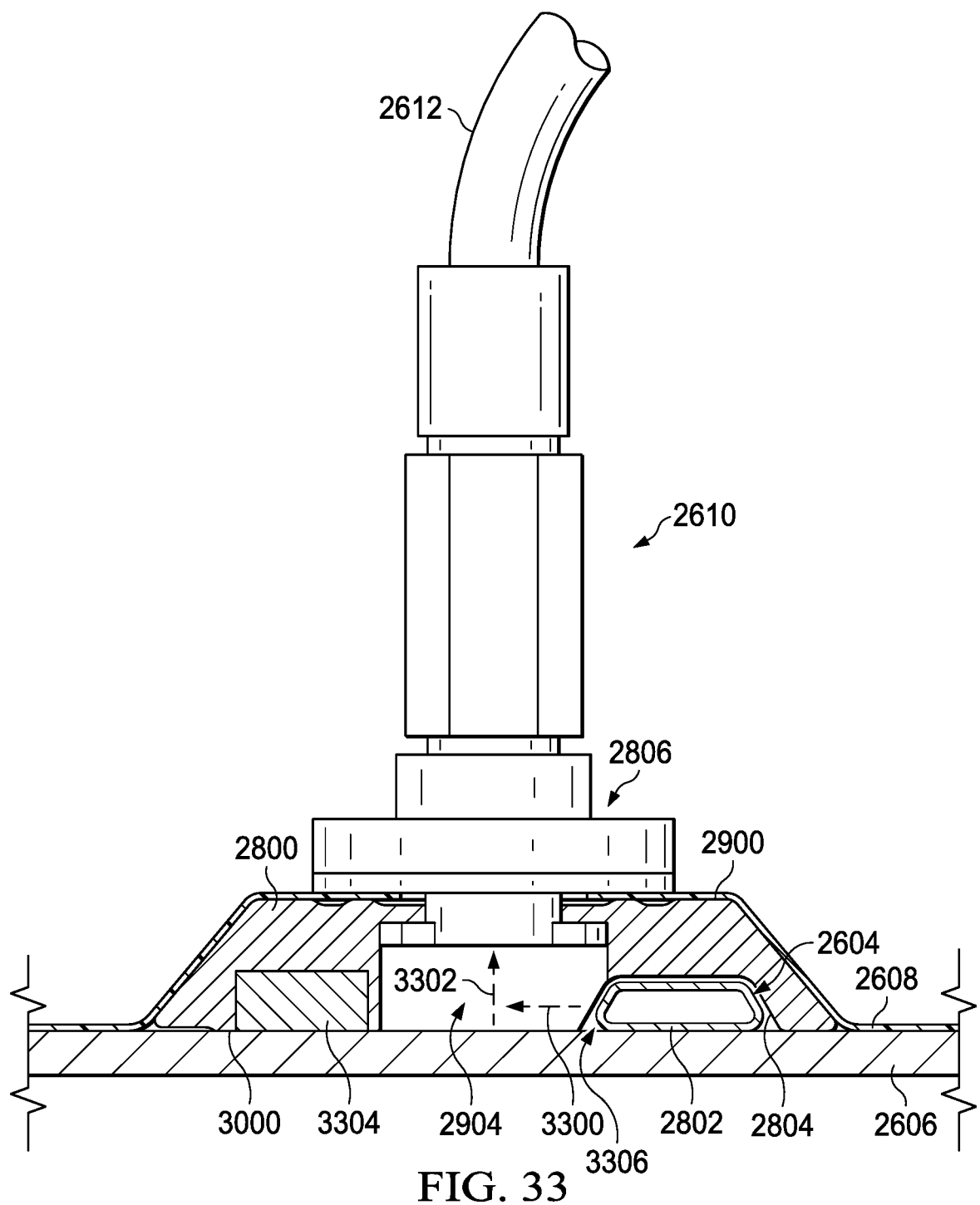
FIG. 33 is an illustration of a cross-sectional view of a vacuum port system and a rigid breather in accordance with an illustrative embodiment.

In FIG. 33, an illustration of a cross-sectional view of a vacuum port base and a rigid breather is depicted in accordance with an illustrative embodiment. FIG. 33 shows a cross-sectional view of composite structure manufacturing system 2600 taken along lines 33-33 in FIG. 28.

As depicted, rigid breather 2802 is positioned within channel 2804 of vacuum port base 2800. Gases flow from rigid breather 2802 in the direction of arrow 3300 into channel 2904. Gases are then drawn out of the system in the direction of arrow 3302. Magnet 3304 is also shown in this view. Magnet 3304 helps hold vacuum port base 2800 against the surface of tool 2606 such that sealant may not be necessary.

As shown in this view, rigid breather 2802 has tent shape 3306. Accordingly, rigid breather 2802 in this form may be referred to as a "tent spring" or "tent breather." Tent shape 3306 may be a preferred configuration to decrease the risk of bag rupture or tearing.

Rigid breather 2802 may incorporate one or more of the features described with reference to the edge breathers described in FIGS. 6-17. Channel 2804 is designed to conform to tent shape 3306 in this illustrative example.

Figure 34:
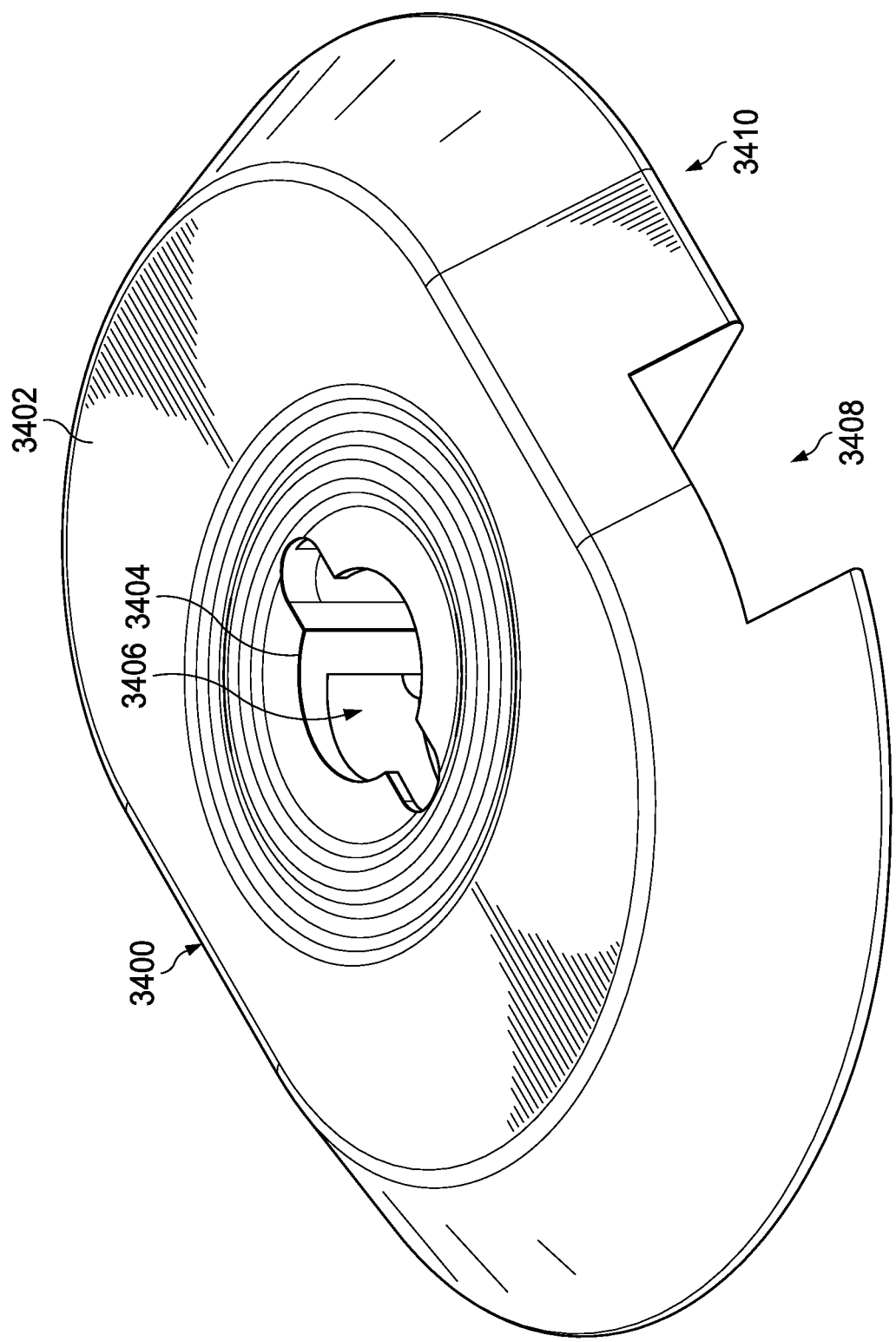
FIG. 34 is an illustration of a top perspective view of another design of a vacuum port base in accordance with an illustrative embodiment.

With reference next to FIG. 34, an illustration of a top perspective view of another design of a vacuum port base is depicted in accordance with an illustrative embodiment. In this illustrative example, vacuum port base 3400 is another implementation for vacuum port base 2712 shown in block form in FIG. 27.

As depicted, vacuum port base 3400 has upper face 3402, opening 3404 for channel 3406, and channel 3408. Channel 3408 receives an edge breather. Vacuum port base 3400 has oval shape 3410 in this illustrative example.

Figure 35:
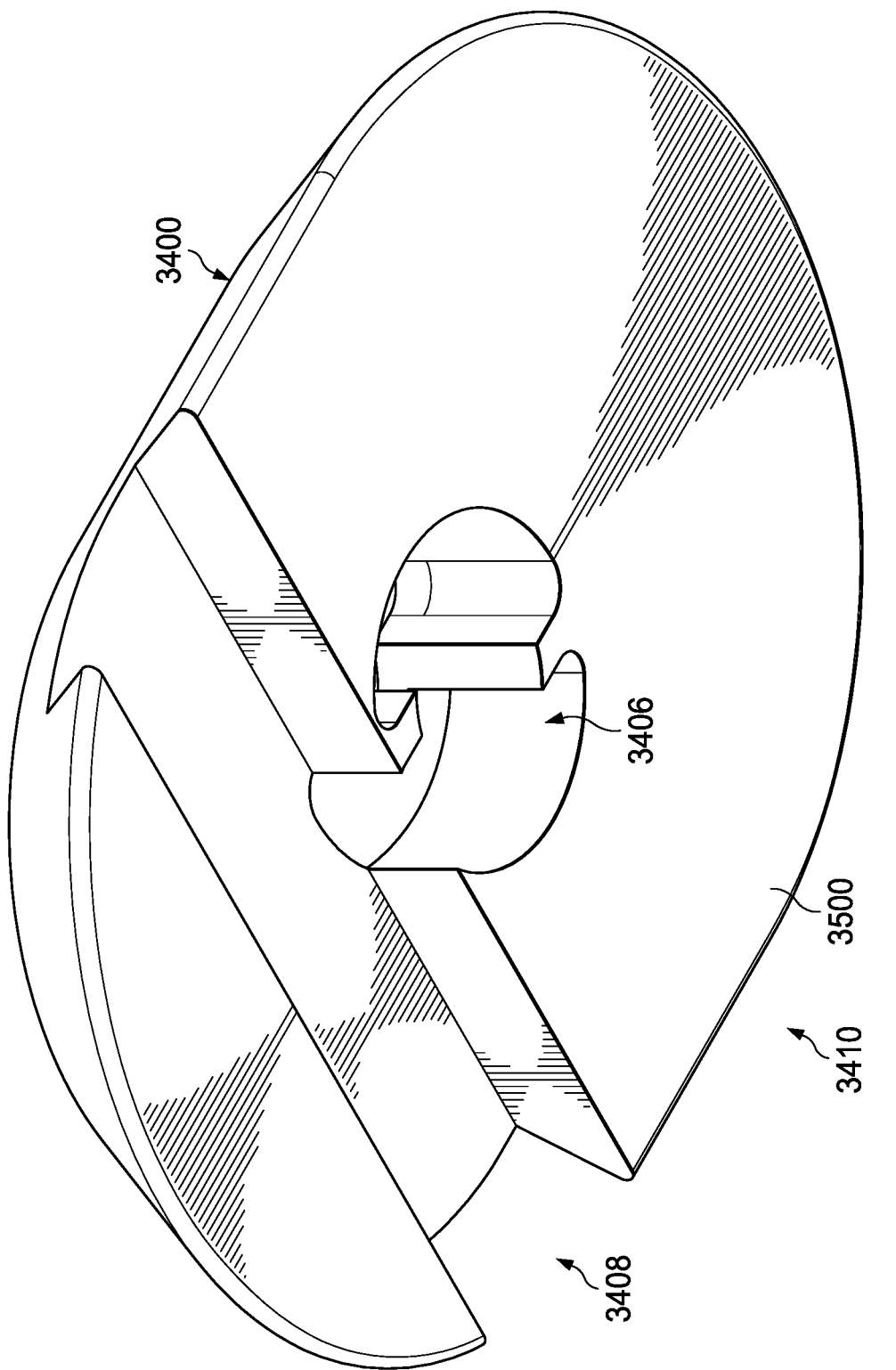
FIG. 35 is an illustration of a bottom perspective view of another design of a vacuum port base in accordance with an illustrative embodiment.

FIG. 35 shows a bottom perspective view of another design of a vacuum port base in accordance with an illustrative embodiment. In this illustrative example, lower surface 3500 of vacuum port base 3400 has a smooth surface.

Figure 36:
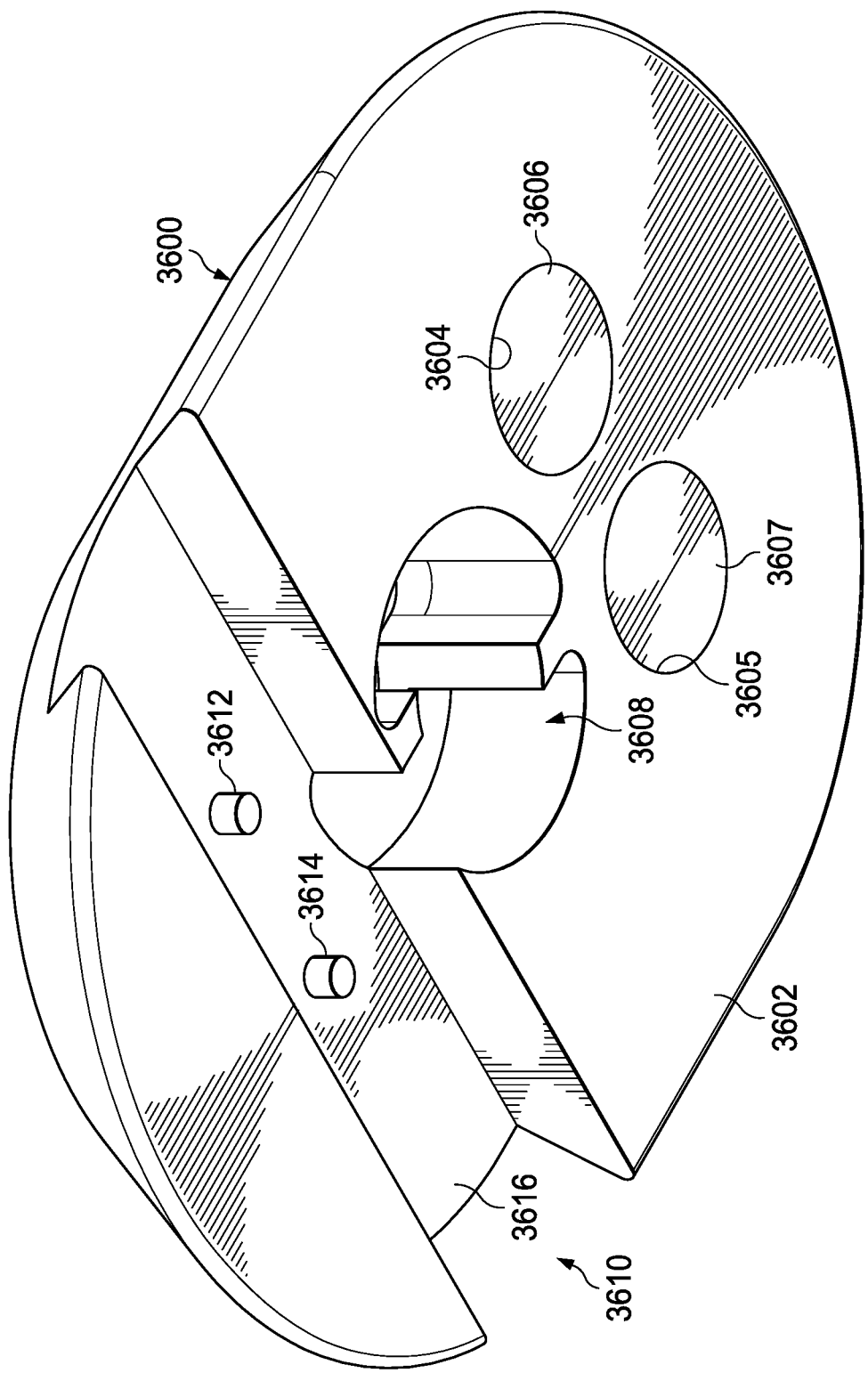
FIG. 36 is an illustration of a bottom perspective view of yet another design of a vacuum port base in accordance with an illustrative embodiment.

In FIG. 36, an illustration of a bottom perspective view of yet another design of a vacuum port base is depicted in accordance with an illustrative embodiment. Vacuum port base 3600 has lower surface 3602. Recess 3604 and recess 3605 are formed within lower surface 3602 and receive magnet 3606 and magnet 3607, respectively. Channel 3608 and channel 3610 are formed in vacuum port base 3600. Channel 3608 and channel 3610 are in fluid communication with one another.

As illustrated, pin 3612 and pin 3614 protrude from channel wall 3616. Pin 3612 and pin 3614 may engage with a rigid breather to hold vacuum port base 3600 to the rigid breather. In some illustrative examples, pin 3612 and pin 3614 may attach to different sections of a rigid breather and serve as a connector for those two sections.

The different components shown in FIG. 26 and FIGS. 28-36 may be combined with components in FIG. 27, used with components in FIG. 27, or a combination of the two. Additionally, some of the components in FIG. 1 and FIGS. 28-36 may be illustrative examples of how components shown in block form in FIG. 27 may be implemented as physical structures.

Other configurations of vacuum port base 2800 may be implemented other than those shown in FIGS. 28-36. For example, a vacuum port base may have various other shapes. It also may be configured to receive more than one rigid breather. In such an embodiment, two or more channels, or one larger channel, may be formed in the lower face of the vacuum port base.

In still other illustrative examples, composite structure manufacturing system 2600 may require more than one port to provide a desired level of pressure and air flow to eliminate gases from the composite structure. Each different port system includes a vacuum port base as described herein.

Figure 37:
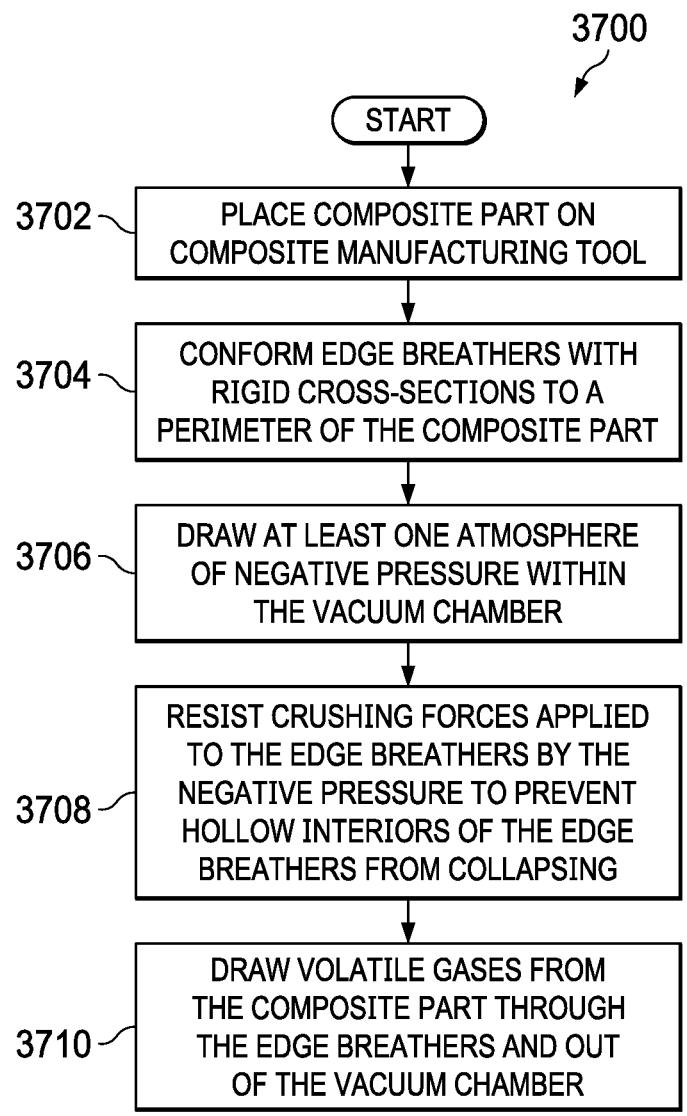
FIG. 37 is an illustration of a flowchart of a method for utilizing a vacuum bag manufacturing system in accordance with an illustrative embodiment.

The operation of system 100 from FIG. 1 will be discussed with respect to FIG. 37. Assume, for this embodiment, that part 140 is ready to be cured but has not yet been placed onto tool 110. FIG. 37 is a flowchart illustrating method 3700 for utilizing a vacuum bag manufacturing system 100 in an illustrative embodiment. The steps of method 3700 are described with reference to system 100 of FIG. 1, but those skilled in the art will appreciate that method 3700 may be performed in other vacuum bag manufacturing systems. The steps of the flowcharts described herein are not all inclusive and may include other steps not shown. The steps described herein may also be performed in an alternative order.

According to FIG. 37, composite part 140 is placed/laid on top of tool 110 (step 3702). Edge breathers (130, 132, 134, 136) conforming with one or more of the enhanced geometries described above are then selected for use with part 140, and may be flexibly conformed/reshaped/adjusted/contoured to a perimeter of part 140 (step 3704). A vacuum chamber comprising vacuum bag 120 may then be created around composite part 140 and the edge breathers (130, 132, 134, 136), as described above with respect to FIGS. 2-5. A negative pressure of at least one atmosphere is drawn in the vacuum chamber via vacuum hose 160 (step 3706), and gases are drawn from part 140 through edge breather 132. During this process, the edge breathers (130, 132, 134, 136), which are rigid with respect to their cross-sections, resist crushing forces that are applied while the vacuum is drawn (step 3708). This prevents the interiors of the edge breathers (130, 132, 134, 136) from getting pinched or crushed, or otherwise collapsing. Furthermore, since the edge breathers (130, 132, 134, 136) resist crushing forces, air is drawn from part 140 through the edge breathers (130, 132, 134, 136) and out of the vacuum chamber (step 3710). Since the interiors of the edge breathers (130, 132, 134, 136) do not collapse, volatile gases are drawn from part 140 through the edge breathers (130, 132, 134, 136) and out of the vacuum chamber.

Figure 38:
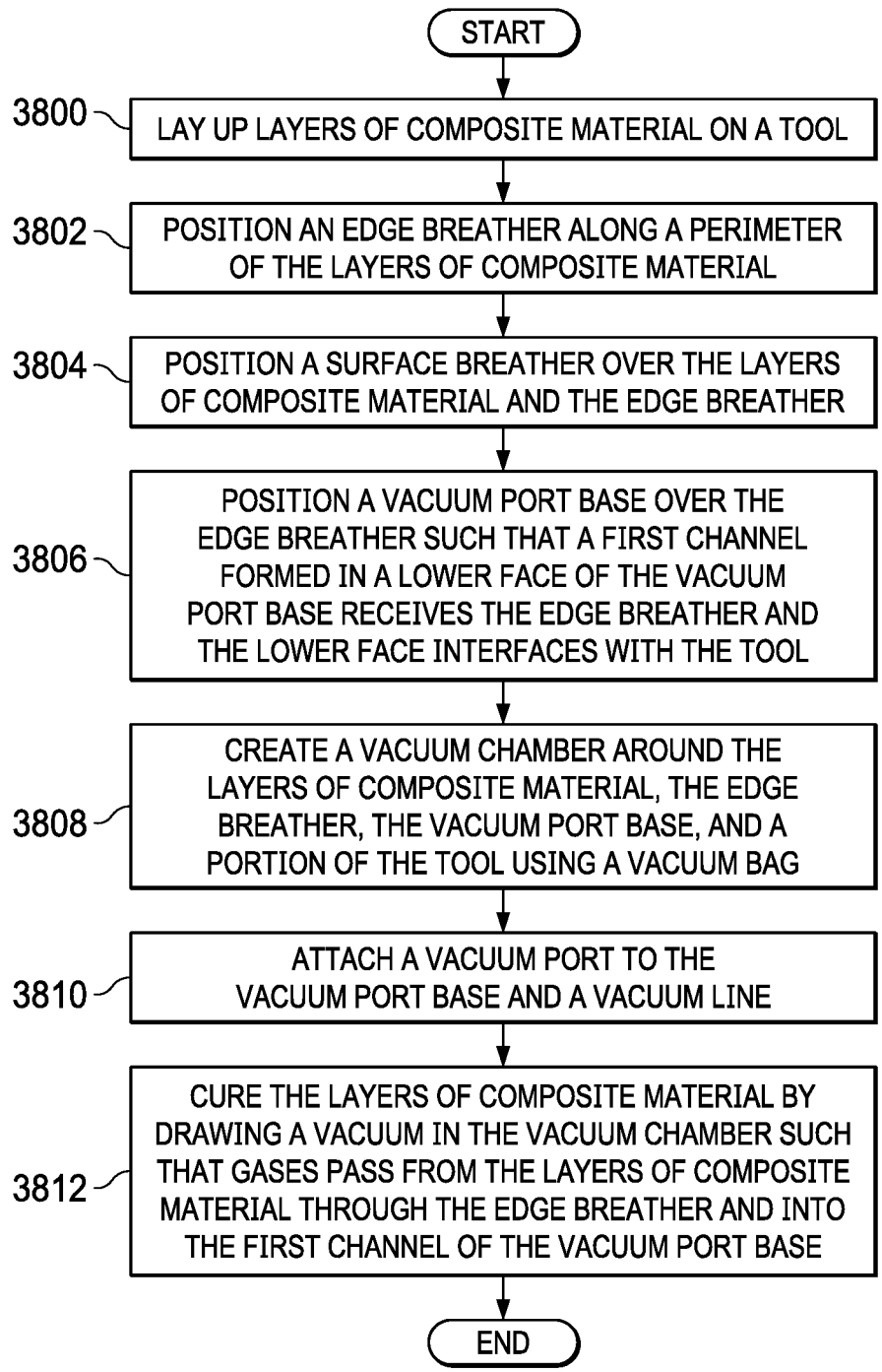
FIG. 38 is an illustration of a flowchart of a process for forming a composite structure for an aircraft in accordance with an illustrative embodiment.

With reference next to FIG. 38, an illustration of a flowchart of a process for forming a composite structure for an aircraft is depicted in accordance with an illustrative embodiment. The method depicted in FIG. 38 may be used to form composite structure 2704 for aircraft 2707 shown in FIG. 27.

The process begins by laying up layers of composite material on a tool (operation 3800). Next, an edge breather is positioned along a perimeter of the layers of composite material (operation 3802).

A surface breather is positioned over the layers of composite material and the edge breather (operation 3804). A vacuum port base is positioned over the edge breather such that a first channel formed in a lower face of the vacuum port base receives the edge breather and the lower face interfaces with the tool (operation 3806). The surface breather is located between the edge breather and the vacuum port base within the first channel.

A vacuum chamber is created around the layers of composite material, the edge breather, the vacuum port base, and a portion of the tool using a vacuum bag (operation 3808). A vacuum port is attached to the vacuum port base and a vacuum line (operation 3810). The vacuum port is in fluid communication with a second channel formed within the vacuum port base. The layers of composite material are then cured by drawing a vacuum in the vacuum chamber such that gases pass from the layers of composite material through the edge breather and into the first channel of the vacuum port base (operation 3812), with the process terminating thereafter.

A vacuum port base in accordance with an illustrative embodiment may be installed in a composite structure manufacturing system in a different manner than described herein. For example, the vacuum port base may be attached to the tool using a number of magnets. In some cases, pins in the vacuum port base engage with the edge breather to secure the edge breather to the vacuum port base.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 39:
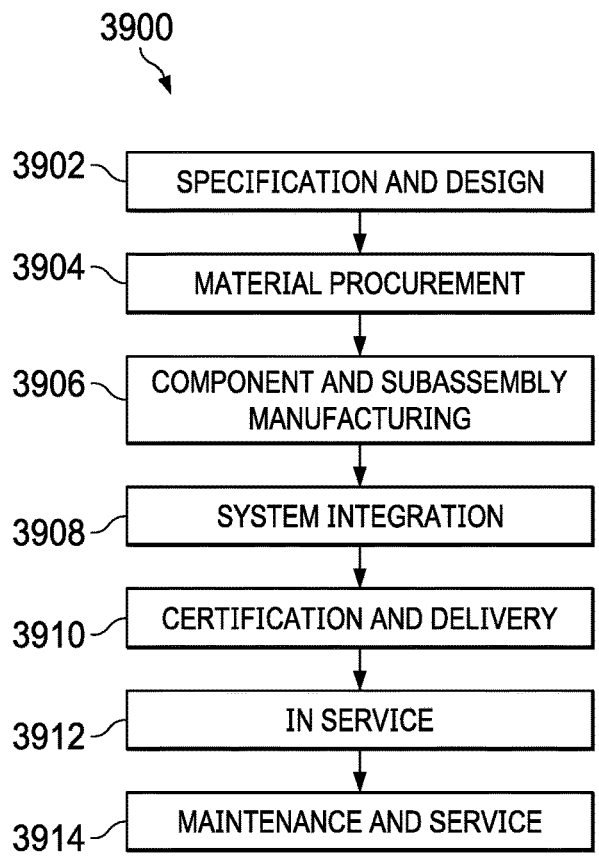
FIG. 39 is an illustration of a block diagram of an aircraft manufacturing and service method in accordance with an illustrative embodiment.
Figure 40:
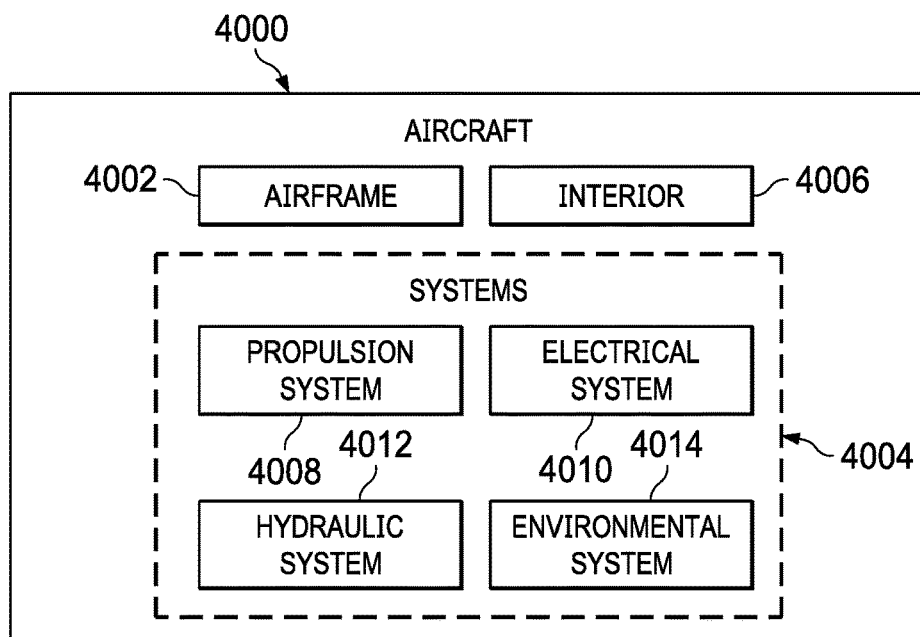
FIG. 40 is an illustration of a block diagram of an aircraft in which an illustrative embodiment may be implemented.

Illustrative embodiments of the disclosure may be described in the context of aircraft manufacturing and service method 3900 as shown in FIG. 39 and aircraft 4000 as shown in FIG. 40. Turning first to FIG. 39, an illustration of a block diagram of an aircraft manufacturing and service method is depicted in accordance with an illustrative embodiment. During pre-production, aircraft manufacturing and service method 3900 may include specification and design 3902 of aircraft 4000 in FIG. 40 and material procurement 3904.

During production, component and subassembly manufacturing 3906 and system integration 3908 of aircraft 4000 in FIG. 40 takes place. Thereafter, aircraft 4000 in FIG. 40 may go through certification and delivery 3910 in order to be placed in service 3912. While in service 3912 by a customer, aircraft 4000 in FIG. 40 is scheduled for routine maintenance and service 3914, which may include modification, reconfiguration, refurbishment, and other maintenance or service.

Composite structure 2704 from FIG. 27 formed using composite structure manufacturing system 2702 with vacuum port base 2712 may be made during component and subassembly manufacturing 3906. In addition, vacuum port base 2712 may be used with composite structure manufacturing system 2702 to modify parts made for routine maintenance and service 3914 as part of a modification, reconfiguration, or refurbishment of aircraft 4000 in FIG. 40.

Each of the processes of aircraft manufacturing and service method 3900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 40, an illustration of a block diagram of an aircraft is depicted in which a composite structure made using an illustrative embodiment may be implemented. In this example, aircraft 4000 is produced by aircraft manufacturing and service method 3900 in FIG. 39 and may include airframe 4002 with plurality of systems 4004 and interior 4006. Examples of systems 4004 include one or more of propulsion system 4008, electrical system 4010, hydraulic system 4012, and environmental system 4014. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 3900 in FIG. 39.

In one illustrative example, components or subassemblies produced in component and subassembly manufacturing 3906 in FIG. 39 may be fabricated or manufactured in a manner similar to components or subassemblies produced while aircraft 4000 is in service 3912 in FIG. 39. As yet another example, one or more apparatus embodiments, method embodiments, or a combination thereof may be utilized during production stages, such as component and subassembly manufacturing 3906 and system integration 3908 in FIG. 39. One or more apparatus embodiments, method embodiments, or a combination thereof may be utilized while aircraft 4000 is in service 3912, during maintenance and service 3914 in FIG. 39, or both. The use of a number of the different illustrative embodiments may substantially expedite the assembly of aircraft 4000, reduce the cost of aircraft 4000, or both expedite the assembly of aircraft 4000 and reduce the cost of aircraft 4000.

Various embodiments described herein include enhanced edge breathers for composite parts. In particular, the edge breathers are designed to have rigid cross sections that resist crushing forces applied by a vacuum bag and heat applied by an autoclave. At the same time, at least some of the edge breathers described herein are substantially flexible along their length.

This ensures that the edge breathers hold to any suitable shape for a part (even a curved shape), while also resisting the substantial crushing forces and high temperatures applied when curing the part (e.g., 90 pounds per square inch (PSI) of negative pressure applied by a vacuum bag, at hundreds of degrees Fahrenheit in an autoclave). Furthermore, because the edge breathers are not substantially damaged by the curing process, they may be utilized multiple times during the production of the composite part in order to save cost.

One illustrative embodiment is an apparatus that includes an edge breather to facilitate manufacturing of a composite part. The edge breather includes a body, ridges disposed along a length of the body that each define an arc which is perpendicular to a lengthwise axis of the body, and openings disposed along the body that enable air to enter a hollow interior that runs along the length of the body. The arcs defined by the ridges resist compressive loads applied to the edge breather and prevent the hollow interior from collapsing under pressure applied to the edge breather by a vacuum bag during manufacturing of the composite part.

A further illustrative embodiment is an apparatus that includes a vacuum port to facilitate manufacturing of a composite part. The vacuum port includes a body, a fitting within the body that receives a vacuum hose, and a hollow passageway defined by the body that penetrates a sidewall of the body and cuts through a bottom portion of the body. The vacuum port also includes a channel that couples the passageway to the fitting to enable air to freely travel from the passageway to the fitting. The passageway is dimensioned to cover an edge breather without compressing the edge breather when the port is laid atop the edge breather.

A further illustrative embodiment is a system that includes a composite manufacturing mold, a composite part placed atop the mold, and edge breathers that conform with a perimeter of the composite part. The edge breathers have a rigid cross-section. A vacuum bag is placed atop the edge breathers and is sealed to the mold. A vacuum port penetrates the vacuum bag, and provides a route for air to exit the edge breather and travel into the vacuum port.

Yet another illustrative embodiment is a method. The method includes placing a composite part on a mold, and conforming edge breathers that have rigid cross sections to a perimeter of the composite part. The method also includes drawing at least one atmosphere of negative pressure within the vacuum chamber, resisting crushing forces applied to the edge breathers by the negative pressure to prevent hollow interiors of the edge breathers from contracting, and drawing volatile gases from the composite part through the edge breathers and out of the vacuum chamber.

Various illustrative embodiments described herein provide a vacuum port base for use with rigid breather technology. With the use of a vacuum port base in accordance with an illustrative embodiment, composite fabricators can incorporate a high-flow (low resistance) rigid breather without modifying existing tooling in order to manufacture a composite structure. Many currently used systems require additional provisions in the tooling during machining. The design of the vacuum port base as described herein eliminates the need to modify such tooling to take advantage of increased vacuum flow and elimination of undesired gases from the layers of composite material.

In the event of bag failure, the increased flow through the breather will help mitigate lamination defects by maintaining vacuum compaction on the layers of composite material. Increased vacuum flow will also lead to a reduction in the overall number of ports needed to maintain a desired level of vacuum compaction, therefore reducing the risk of bag damage and/or port failure. A reduction in the number of ports used during curing reduces operator touch time during bagging operations. The shape, contour, and low profile of the vacuum port base also reduces the risk of inadvertent bag damage from sharp edges.

Magnetically attaching the vacuum port base to the tool may reduce the need for sealants or adhesives in certain areas of the system. Consumables may be further reduced with the use of recyclable rigid breathers.

These advantages result in cost savings for the manufacturer. In addition, the illustrative embodiments may increase the quality of laminates manufactured using the processes described with reference to FIGS. 37-38 over currently used systems.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vacuum port base comprising:
    an upper face configured to interface with a vacuum port;
    a lower face configured to interface with a surface of a tool;
    a first channel formed in the lower face and configured to receive an edge breather; and
    a second channel formed within the vacuum port base and leading to a lateral opening in the first channel, wherein the second channel is configured to receive the vacuum port such that the vacuum port is in fluid communication with the first channel and the edge breather to remove gases from a composite structure.

2. The vacuum port base of claim 1 further comprising:
    a number of magnets configured to magnetically attach the vacuum port base to the tool.

3. The vacuum port base of claim 2 further comprising:
    a number of recesses formed within the lower face and configured to house the number of magnets such that each magnet is flush against the lower face and a surface of the tool.

4. The vacuum port base of claim 1 further comprising:
    elongate grooves formed in the lower face and running radially from the first channel toward an edge of the lower face of the vacuum port base.

5. The vacuum port base of claim 1, wherein the edge breather is a rigid breather.

6. The vacuum port base of claim 5, wherein the rigid breather has a tent shape.

7. The vacuum port base of claim 5 further comprising:
a number of pins associated with the first channel, wherein the number of pins is configured to engage with the rigid breather to hold the rigid breather in place.

8. The vacuum port base of claim 7, wherein the rigid breather comprises a first section and a second section and further comprising:
a first pin in the number of pins, wherein the first pin engages with the first section of the rigid breather; and
a second pin in the number of pins, wherein the second pin engages with the second section of the rigid breather to connect the first section to the second section within the first channel.

9. The vacuum port base of claim 1, wherein the vacuum port base has a circular shape, and wherein the lower face has a larger diameter than the upper face.

10. The vacuum port base of claim 1 further comprising:
circular grooves formed within the upper face, wherein the circular grooves surround an opening of the second channel.

11. A method for forming a composite structure, the method comprising:
laying up layers of composite material on a tool;
positioning an edge breather along a perimeter of the layers of composite material; and
positioning a vacuum port base over the edge breather such that a first channel formed in a lower face of the vacuum port base receives the edge breather, wherein the lower face interfaces with the tool, and a second channel formed within the vacuum port base and leads to a lateral opening in the first channel such that the vacuum port is in fluid communication with the first channel and the edge breather to remove gases from the composite structure.

12. The method of claim 11 further comprising:
positioning a surface breather over the layers of composite material and the edge breather, wherein the surface breather is located between the edge breather and the vacuum port base within the first channel.

13. The method of claim 11 further comprising:
creating a vacuum chamber around the layers of composite material, the edge breather, the vacuum port base, and a portion of the tool using a vacuum bag.

14. The method of claim 13 further comprising:
attaching a vacuum port to the vacuum port base and a vacuum line, wherein the vacuum port is in fluid communication with the second channel formed within the vacuum port base; and
curing the layers of composite material.

15. The method of claim 14, wherein curing the layers of composite material comprises:
drawing a vacuum in the vacuum chamber such that the gases pass from the layers of composite material through the edge breather and into the first channel of the vacuum port base.

16. The method of claim 11 further comprising:
attaching the vacuum port base to the tool using a number of magnets positioned within a number of recesses formed in the lower face of the vacuum port base.

17. The method of claim 11, wherein the edge breather is a rigid breather and further comprising:
securing the rigid breather within the first channel using a number of pins.

18. A composite structure manufacturing system comprising:
a tool for forming a composite structure;
a rigid breather positioned on top of a surface of the tool;
a vacuum port;
a vacuum port base positioned on top off the rigid breather, the vacuum port base comprising:
an upper face configured to interface with the vacuum port;
a lower face configured to interface with a surface of the tool;
a first channel formed in the lower face and configured to receive the rigid breather; and
a second channel formed within the vacuum port base and leading to a lateral opening in the first channel, wherein the second channel is configured to receive the vacuum port such that the vacuum port is in fluid communication with the first channel and the rigid breather; and
a vacuum bag creating a vacuum chamber around the rigid breather, the vacuum port base, layers of composite material positioned on top of the tool, and a portion of the tool.

19. The composite structure manufacturing system of claim 18, wherein the vacuum port base further comprises:
a number of magnets configured to magnetically attach the vacuum port base to the tool; and
a number of recesses formed within the lower face and configured to house the number of magnets such that each magnet is flush against the lower face and the tool.

20. The composite structure manufacturing system of claim 19, wherein the vacuum port base further comprises:
a number of pins within the first channel, wherein the number of pins is configured to engage with the rigid breather to hold the rigid breather in place.

* * * * *